US011695656B2

United States Patent
Han et al.

(10) Patent No.: US 11,695,656 B2
(45) Date of Patent: Jul. 4, 2023

(54) METHOD AND APPARATUS FOR DETECTING SERVICE AND ANALYZING SERVICE CHARACTERISTIC USING NWDAF IN MOBILE COMMUNICATION SYSTEM

(71) Applicant: Samsung Electronics Co., Ltd., Suwon-si (KR)

(72) Inventors: Yoonseon Han, Suwon-si (KR); Jungshin Park, Suwon-si (KR); Sangsoo Jeong, Suwon-si (KR); Kisuk Kweon, Suwon-si (KR); Sunghoon Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/711,656

(22) Filed: Apr. 1, 2022

(65) Prior Publication Data

US 2022/0224612 A1    Jul. 14, 2022

Related U.S. Application Data

(63) Continuation of application No. 17/029,338, filed on Sep. 23, 2020, now Pat. No. 11,296,959.

(30) Foreign Application Priority Data

Sep. 27, 2019   (KR) .......................... 10-2019-0120034

(51) Int. Cl.
*H04L 43/028*   (2022.01)
*H04W 24/10*   (2009.01)
*H04W 4/70*   (2018.01)

(52) U.S. Cl.
CPC ............. *H04L 43/028* (2013.01); *H04W 4/70* (2018.02); *H04W 24/10* (2013.01)

(58) Field of Classification Search
CPC ..... H04L 43/028; H04L 43/026; H04L 47/24; H04L 12/1407; H04L 41/5048; H04W 4/70; H04W 24/10; H04W 24/02
See application file for complete search history.

(56) References Cited

U.S. PATENT DOCUMENTS 11,356,888 B2 *  6/2022  Li .......................... H04W 40/36
2019/0222489 A1  7/2019  Shan
(Continued)

FOREIGN PATENT DOCUMENTS

KR   10-2005-0110177 A    11/2005
WO       2018/008980 A1    1/2018
(Continued)

OTHER PUBLICATIONS

3rd Generation Partnership Project; Technical Specification Group Services and System Aspects; System Architecture for the 5G System; Stage 2 (Release 15), 3GPP TS 23.501 V15.3.0, Sep. 17, 2018, p. 26, Valbonne, France.
(Continued)

*Primary Examiner* — Austin J Moreau
(74) *Attorney, Agent, or Firm* — Jefferson IP Law, LLP

(57) ABSTRACT

The disclosure relates to a communication method and a system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The
(Continued)

disclosure relates to apparatuses and methods for detecting a specific service through a network data analytics function (NWDAF) in a mobile communication system and analyzing a characteristic related to the service.

10 Claims, 16 Drawing Sheets

(56) References Cited

U.S. PATENT DOCUMENTS

| | | | |
|---|---|---|---|
| 2019/0364541 A1 | 11/2019 | Ryu | |
| 2020/0112907 A1* | 4/2020 | Dao | H04M 15/84 |
| 2021/0051528 A1 | 2/2021 | Srivastava et al. | |

FOREIGN PATENT DOCUMENTS

| | | | |
|---|---|---|---|
| WO | 2019/158777 A1 | 8/2019 | |
| WO | 2019184433 A1 | 10/2019 | |
| WO | WO-2020147927 A1 * | 7/2020 | ........... H04L 41/147 |
| WO | 2021018405 A1 | 2/2021 | |
| WO | 2021091435 A1 | 5/2021 | |
| WO | 2021225317 A1 | 11/2021 | |

OTHER PUBLICATIONS

3rd Generation Partnership Project; Technical Specification Group Services and System Aspects; Policy and Charging Control Framework for the 5G System; Stage 2 (Release 15), 3GPP TS 23.503 V15.4.0, Dec. 18, 2018, p. 26, Valbonne, France.
International Search Report dated Jan. 5, 2021, issued in International Application No. PCT/KR2020/012893.

* cited by examiner

METHOD AND APPARATUS FOR DETECTING SERVICE AND ANALYZING SERVICE CHARACTERISTIC USING NWDAF IN MOBILE COMMUNICATION SYSTEM

CROSS-REFERENCE TO RELATED APPLICATION(S)

This application is a continuation application of prior application Ser. No. 17/029,338, filed on Sep. 23, 2020, which has issued as U.S. Pat. No. 11,296,959 on Apr. 5, 2022 and is based on and claims priority under 35 U.S.C. § 119(a) of a Korean patent application number 10-2019-0120034, filed on Sep. 27, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for detecting a specific service and analyzing a service-related characteristic using a network data analytics function in a mobile communication system.

2. Description of Related Art

To meet the demand for wireless data traffic having increased since deployment of $4^{th}$-Generation (4G) communication systems, efforts have been made to develop an improved 5th-Generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (millimeter (mm)Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, when network analytics information provided by an NWDAF is transmitted, various problems may occur and research to address the issues is being actively conducted.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of detecting various services (or applications) provided through a mobile communication system and a method of analyzing and providing characteristics of services (or applications).

Another aspect of the disclosure is to provide a method of detecting services in a $5^{th}$ generation (5G) mobile communication system including the existing long term evolution (LTE) system performed by distributing a rule for detecting service data flow predefined by a mobile communication system operator or a service operator. When data of specific service is detected, it is recognized that the specific service has been detected and then quality of service (QoS) requirements and a charging-related policy are applied. In such a process, a method used to detect the service may refer to a field, such as a network address included in header information for transmitting user data. Further, in order to detect a specific application, a device, such as a user plane function (UPF) or a specific packet data network gateway (P-GW) may configure a rule for performing accurate detection through header matching and deep packet inspection (DPI) in the form of packet flow description (PFD) and conduct the rule.

As current method of detecting the service and the application, only a method by which an operator applies in advance a detection rule or a service provider provides a detection method from the outside to distribute the detection rule to the UPF via the policy changing function (PCF) and the session management function (SMF) has been standardized. Further, a rule for detecting an application using information within a packet by a DPI device is conducted through only exchange of predefined information between a manufacturer supplying the DPI device and a network manager. Accordingly, detection for services which are not predefined cannot be performed, and a traffic management policy related to a newly introduced service cannot be applied or a network manager is required to manually define a traffic detection rule and configure a relevant policy and charging control (PCC) policy.

The technical subjects pursued in the disclosure may not be limited to the above mentioned technical subjects, and other technical subjects which are not mentioned may be clearly understood, through the following descriptions, by those skilled in the art to which the disclosure pertains.

Additional aspects will be set forth in part in the description which follows and, in part, will be apparent from the description, or may be learned by practice of the presented embodiments.

In accordance with an aspect of the disclosure, a method of a first network entity performing a UPF in a mobile communication system is provided. The method includes receiving a request for transmitting data of at least one packet for service detection from a second network entity performing a network data analytics function (NWDAF), acquiring the data of the at least one packet, based on the request, and transmitting the data of the at least one packet to the second network entity.

In an embodiment of the disclosure, when new packet flow is detected by the first entity, the request may be a first request for transmitting data of at least one packet included in the new packet flow or a second request for transmitting data of all packets during a specific time period.

In an embodiment of the disclosure, when the request is the first request, the acquiring of the data of the at least one packet, based on the request may include detecting the new packet flow, based on the first request and acquiring data of at least one packet included in the new packet flow.

In the embodiment of the disclosure, the first request may include identification information related to the first request, information indicating the number of packets to be transmitted, or information indicating whether data of the packet includes a payload of the packet.

In an embodiment of the disclosure, the first request may further include filter information for specific traffic, and the filter information may include at least one piece of identification information of the user equipment (UE) related to the specific traffic, information on a group of the UE, identification information of a power distribution unit (PDU) session, data network name (DNN) information, data network access identification (DNAI) information, single network slice selection assistance information (S-NSSAI), or time information.

In an embodiment of the disclosure, when the request is the second request, the acquiring of the data of the at least one packet, based on the request may include identifying the specific time period, based on the second request and acquiring data of all packets during the specific time period.

In an embodiment of the disclosure, the second request may include at least one piece of identification information related to the second request, information on the length of the specific time period, or information indicating whether data of the packet includes the payload of the packet.

In an embodiment of the disclosure, the second request may further include filter information for specific traffic, and the filter information may include at least one piece of identification information of the UE related to the specific traffic, information on a group of the UE, identification information of a PDU session, data network name (DNN) information, data network access identification (DNAI) information, single network slice selection assistance information (S-NSSAI), or time information.

In accordance with another aspect of the disclosure, a method of a first network entity for performing a network data analytics function (NWDAF) in a mobile communication system is provided. The method includes receiving a request for analyzing network performance for each transmission path of a service from a second network entity, analyzing the network performance for each transmission path of the service, based on the request, and transmitting a result of the analysis to the second network entity, wherein the transmission path may be a transmission path between a third network entity for performing a UPF and an external server for providing the service.

In an embodiment of the disclosure, the transmission path may be associated with DNAI information.

In an embodiment of the disclosure, the second network entity may be one of a network entity performing the SMF, a network entity performing the PCF, or a network entity performing the application function (AF).

In an embodiment of the disclosure, when the second network entity is the network entity performing the SMF, the result of the analysis may be used to select the third network entity by the second network entity.

In an embodiment of the disclosure, when the second network entity is the network entity performing the PCF or the network entity performing the AF, the result of the analysis may be used to determine data DNAI information for a PDU session associated with the service by the second network entity.

In accordance with another aspect of the disclosure, a first network entity for performing a UPF in a mobile communication system is provided. The first network entity includes a transceiver, and a controller configured to control the transceiver, wherein the controller is configured to receive a request for transmitting data of at least one packet for service detection from a second network entity for performing a NWDAF, acquire the data of the at least one packet, based on the request, and transmit the data of the at least one packet to the second network entity.

In an embodiment of the disclosure, when new packet flow is detected by the first entity, the request may be a first request for transmitting data of at least one packet included in the new packet flow or a second request for transmitting data of all packets during a specific time period.

In an embodiment of the disclosure, the first request may include at least one piece of identification information related to the first request, information indicating the number of packets to be transmitted, information indicating whether data of the packets includes payload of the packets, and filter information of specific traffic, and the filter information may include at least one piece of identification information of a UE related to the specific traffic, information on a group of the UE, identification information of a PDU session, DNN information, DNAI information, S-NSSAI information, and time information.

In an embodiment of the disclosure, the second request may include at least one piece of identification information related to the second request, information indicating the length of the specific time period, information indicating whether data of the packets includes payload of the packets, and filter information of specific traffic, and the filter information may include at least one piece of identification information of a UE related to the specific traffic, information on a group of the UE, identification information of a PDU session, DNN information, DNAI information, S-NSSAI information, and time information.

In accordance with another aspect of the disclosure, a first network entity for performing a NWDAF in a mobile communication system is provided. The first network entity includes a transceiver, and a controller configured to control the transceiver, wherein the controller is configured to receive a request for analyzing network performance for each transmission path of a service from a second network entity, analyze the network performance for each transmission path of the service, based on the request, and transmit a result of the analysis to the second network entity, and the transmission path may be a transmission path between a third network entity for performing a UPF and an external server for providing the service.

In an embodiment of the disclosure, the transmission path may be associated with data DNAI information.

In an embodiment of the disclosure, the second network entity may be one of a network entity performing the SMF, a network entity performing the PCF, or a network entity performing the AF.

The number of services and applications provided through a mobile communication network has increased geometrically over time, and network quality and performance-related requirements required for the services are different. In order to differentiate and provide network quality and performance for a specific service, it is required to first detect the service and clearly detect quality and performance requirements required for the service. However, when a newly introduced or a fixed specific address is not used, the method of the related art has difficulty or impossibility in detecting an application and a characteristic thereof and should manually configure many factors to provide such differentiated functions.

According to various embodiments of the disclosure, a method of detecting a specific service may be learned, and the method may be augmented and transmitted to entities included in a core network. Through such a process, it is possible to automatically differentiate and provide network quality and performance requirements required for newly introduced services or services of which the location or configuration is dynamically changed by automating the application of network quality and service requirements of a specific service. Further, a method of performing a function for automatically detecting and blocking packets provided by specific malicious or illegal services may be provided. Accordingly, in an aspect of management of a network, an effect of improving total network service quality may be obtained by automating, diversifying, and providing a process for service differentiation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
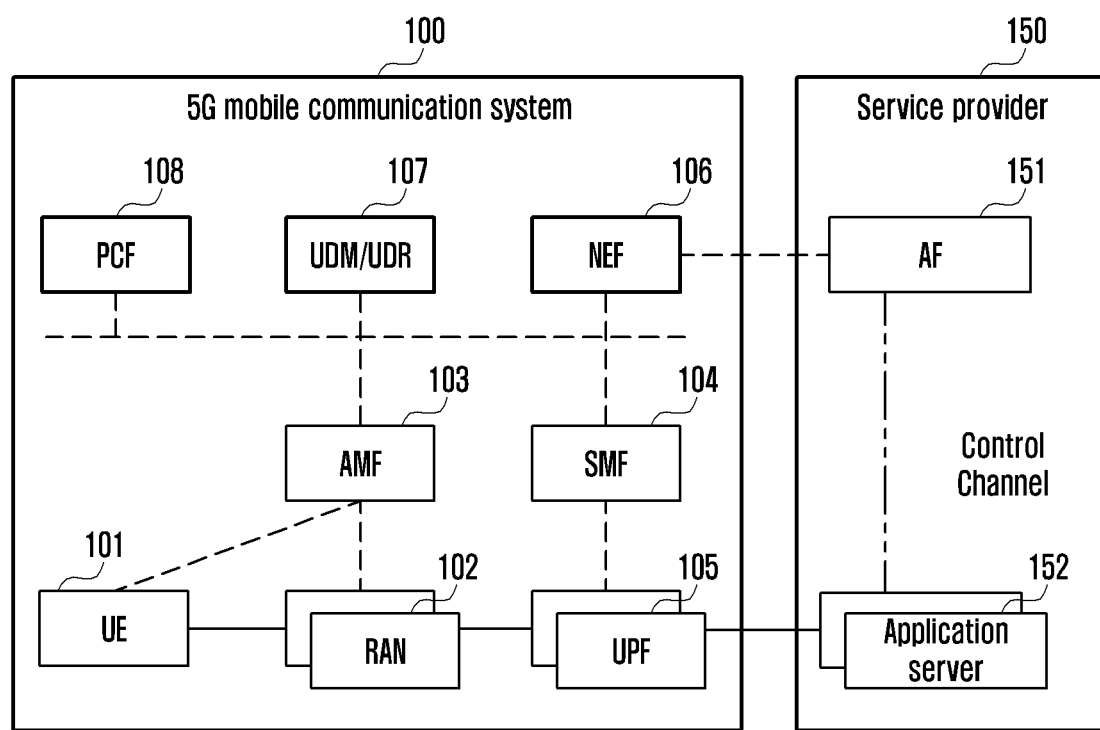
FIG. 1 illustrates a configuration of a communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making a reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

The description of embodiments of the disclosure is made mainly based on a new radio (NR) access network (new RAN) and packet core (a $5^{th}$ generation (5G) system, a 5G core network, or a next generation (NG) core) which is a core network on the 5G mobile communication standard specified by the 3rd generation partnership project (3GPP) corresponding to a mobile communication standardization organization, but the main subject of the disclosure can be applied to other communication systems having a similar technical background with slight modification without departing from the scope of the disclosure, which can be determined by those skilled in the art.

In the following description, the disclosure may use terms and names defined in 3GPP long term evolution (3GPP LTE) standards (standards for 5G, NR, LTE, or similar systems) for the convenience of description. However, the disclosure is not limited by these terms and names, and may be applied in the same way to systems that conform other standards.

Further, in the following description, terms for identifying access nodes, terms referring to network entities, terms referring to network functions (NF), terms referring to messages, terms referring to interfaces between network entities, terms referring to various identification information, and the like are illustratively used for the sake of convenience. In the disclosure, the terms "network entity" and "network object" may be interchangeably used. Therefore, the disclosure is not limited by the terms as used below, and other terms referring to subjects having equivalent technical meanings may be used.

The disclosure includes a method of supporting detection of more accurate service or application (hereinafter, referred to as service) by a user plane function (UPF) or a network data analytics function (NWDAF) by expanding the NWDAF that is one of core network elements of a 5G mobile communication system and a method of analyzing a network quality and performance requirements required by the detected service. Accordingly, when providing a network service between a UE and a data network (DN), the 5G system may provide differentiated performance and quality through distinction of more accurate service. A method of optimizing management of limited network resources may be provided by additionally providing performance and quality information at the normal level required by each service. Further, when illegal or malicious content is included in the service, it is possible to more rapidly and accurately apply a method of restricting or prohibiting the use of the service in units of services based on determination by an internal policy.

A 5G mobile communication system defines an NWDAF, which is a network function (NF) provided by a 5G network to analyze and provide collected data in order to support network automation. The NWDAF may collect/store/analyze information from the 5G network and provide the result thereof to unspecified NFs, and the analysis result may be independently used by the NF, the application function (AF), and operation, administration, and management (OAM). The analytics information provided by the existing NWDAF may include slice load information, a UE mobility/communication pattern, load information of a specific NF, and network state information. The disclosure may include provision of analytics information for a specific service by expanding a service type provided by the NWDAF. The analytics information related to the service may include information indicating whether a specific service is initiated, the number of PDU session of a specific service, the number of UEs using a specific service, a data network name (DNN) and a data network access identifier (DNAI) location for supporting a specific service. The analytics information may be inferred by applying machine leaning or a mathematic modeling tool to relevant information or acquired by applying prediction.

In the disclosure, it is assumed that the case in which information is transmitted through the NEF in order to transmit network analytics information provided by the NWDAF to an edge computing management entity located outside is a basic situation. Additionally or alternatively, when edge computing is provided from a reliable service provider, the service may be directly requested without passing through the NEF to use the service provided by the NWDAF located within the core network.

Entities in the disclosure will be described below. The unit of each function provided by the 5G network system may be defined as a network function (NF). The structure of the 5G mobile communication network is illustrated in FIG. 1.

FIG. 1 illustrates a configuration of a communication system according to an embodiment of the disclosure.

Referring to FIG. 1, the communication system may be a concept including a 5G mobile communication system 100 and a service provider 150 for providing a service outside the network.

Referring to FIG. 1, the communication system includes at least one entity. For example, the communication system may include a UE 101, a base station (RAN) 102, and/or at least one NF. For example, the communication system may include an access and mobility management function (AMF) 103 for managing access to the network and mobility of the user equipment (UE) 101, a session management function (SMF) 104 for performing a function related to a session, a user plane function (UPF) 105 for serving to transmit user data, an application function (AF) 151 for communicating with a 5GC for provision, a network exposure function (NEF) 106 for supporting communication between the 5GC and the AF, a unified data management (UDM)/unified data repository (UDR) 107 for storing and managing data, a policy and control function (PCF) 108 for managing a policy, and/or an application service 152 for providing a data network (DN), such as the Internet through which user data is transmitted. The configuration and function of each entity are described below by way of example.

A radio access technology (RAT) is a technology used for wireless communication between the base station, 5G-NR, evolved-universal terrestrial radio access network (E-UTRAN), UTRAN, or global system for mobile communication (GSM) enhance data rates for GSM evolution (EDGE) radio access network (GERAN,) and the UE, and the UE 101 accesses the RAN (eNB or gNB) 102 supporting a mobile communication radio technology for wireless communication and receives a communication service. The RAN 102 may perform procedures for exchanging a control signal or data received from UEs with a core network (CN), transmitting the control signal or data to a device located in the core network, receiving a configuration, or transmitting and receiving or managing data. Further, the UE may be connected to a data network through a technology using a sidelink, such as a proximity service (Prose) for direct communication between UEs or a Non-3GPP radio access technology, such as wireless fidelity (WiFi) or Bluetooth without any connection with the RAN.

The access and mobility management function (AMF) 103 is a device for managing access and mobility of the UE and may serve as a UE-core network end point for connecting the UE 101 to other devices (network function) of the core network via the RAN 102. The provided functions may include a function of registering and connecting the UE, managing reachability and mobility, identifying access/authentication, and generating a mobility event.

The session management function (SMF) 104 may perform a function of managing a PDU session of the UE. Functions of establishing, modifying, and releasing a session, a function of managing a session through maintenance of a tunnel between the UPF and the AN required therefor, a function of managing allocation of an IP address of the UE, an ARP proxy function, a function of selecting and controlling a user plane, a function of controlling traffic processing by the UPF, and a function of collecting and controlling charging data may be performed.

The PCF 108 may serve to determine access/mobility and a policy of session management applied by the AMF 103 and the SMF 104. The PCF 108 may provide policies to be conducted may be provided to network functions (NFs) for managing (governing) behaviors of all networks and configuring a control plane. Further, the PCF 108 may access information related to determination of the policies by accessing the unified data repository (UDR) 107.

The network exposure function (NEF) 106 may perform a function of transmitting or receiving an event occurring in a mobile communication network and a supporting capability to or from the outside. Representatively, the NEF 106 may perform a function of safely provisioning information on an external application to the core network and a function of converting internal/external information, storing a function received from another NF in the UDR, and then re-distributing the same.

Unified data management (UDM) and unified data repository (UDR) are independent network functions, but functions and roles thereof are similarly used in the embodiment and thus described at the same time as indicated by reference numeral 107. The UDM may correspond to generation of AKA authentication information for 3GPP security, processing of a user ID, reverse concealment of a subscriber concealed ID (SUPI), management of a list of NFs supporting the current UE, management of subscriber information (subscription), and management of SMS. The UDR may correspond to a function of storing and providing subscriber information management by the UDM, structured data to be exposed, and application data related to the NEF or the service.

The user plane function (UPF) 105 may serve to process actual user data and process a packet so as to transmit a packet generated by the UE to the external data network or transmit data from the external data network to the UE. As main functions, the UPF may serve as an anchor between radio access technologies or serve to provide connectivity between a PDU session and an external data network, route and forward a packet, perform packet inspection, apply a user plane policy, making a traffic usage report, and perform buffering.

In addition to the above-described NFs, operation, administration, and management (OAM) which correspond to a system for managing the UE and the 5G mobile communication network may exist. Edge computing infrastructure, an edge computing infrastructure manager, and a service may be included as external entities for providing the service that are not elements of the 5G network system. The edge computing infrastructure manager is an entity which serves to manage resources existing in the edge computing infrastructure and may be an entity, which exists as an independent entity or exists on a specific service or platform to perform the same function. In the disclosure, it is assumed that the edge computing infrastructure manager may exchange information with the 5G core network through the NEF, and, for example, the edge computing infrastructure manager may be the same as the AF or is able to exchange information with the core network through the connection with the AF. The relation between the entities is illustrated in FIG. 1. In FIG. 1, the standardized interface is omitted in communication with the OAM since the interface is not used, but the OAM is able to communicate with all entities in the 5G mobile communication system through its own method. The configuration of the service provider may be different depending on the service, and may be divided into a node serving as a server for actually providing a service, a resource manager for managing servers, or a management node, such as an orchestrator. Such the clear division between nodes may not be performed according to the service, but the division may be logically possible.

The NWDAF may perform a function of analyzing and providing information collected from the network or the outside to the NF. The NWDAF may collect information from the operation, administration, and maintenance (OAM), the NF included in the 5G network, or the AF. The NWDAF may collect information through various methods. As a representative analysis function of the NWDAF, a load level of a network slice instance may be collected and analyzed and the analysis result thereof may be provided to a network slice selection function (NSSF) so that the analysis result is used to select a slice instance to be used by a specific UE. At this time, in order to make a request for analytics information or transmit an analytics result value between a specific NF and the NWDAF, a service-based interface defined in the 5G network may be used.

In the 5G network, the NWDAF providing information collection and analysis functions may provide the following services. However, the services provided by the NWDAF are not limited to the following examples.

Analytics information subscription service (Nnwdaf_AnalyticsSubscription Service): refers to an Nnwdaf_AnalyticsSubscription service or an event subscription service in this specification.

The analytics information subscription service (or event subscription service) is to subscriber or unsubscribe an event generated by the NWDAF, and the event subscription service may be divided into a method of periodically receiving the event and a method of receiving the event only when a specific condition is satisfied. The analytics information subscription service may provide three operations, such as subscribe, unsubscribe, and notify.

When a specific NF desires subscription (Nnwdaf_AnalyticsSubscription), factors which the specific NF transmits to the NWDAF may be divided into a mandatory input factor (inputs required) and an optional input factor (inputs optional). According to an embodiment of the disclosure, the mandatory input may include single network slice selection assistance information (S-NSSAI), an event identifier, a notification target address, and/or event reporting information. However, the mandatory input is not limited thereto. Further, according to an embodiment of the disclosure, the optional input may include at least one piece of information additionally required for processing analytics information. For example, the optional input may include event filter information. However, the optional input is not limited thereto.

In the case of the unsubscription operation (Nnwdaf_AnlayticsSubscription_Unsubscribe), the NF may transmit subscription identifier information to the NWDAF through the mandatory input (required input), and the NWDAF may transmit full text indicating unsubscription to the NF making a request for the operation through the output.

The notification operation (Nnwdaf_AnlayticsSubscription_Notify) is to notify of a specific event by the NWDAF to the NF successfully subscribes the event periodically or when a specific condition is satisfied. According to an embodiment of the disclosure, mandatory input information (required input) of the notification operation may include an event identifier, a notification target address, a network slice instance identifier, and/or load information of a network slice instance (load level information of network slice instance), and may not include mandatory output information (required output). However, the required input and/or required output are not limited thereto.

Analytics information request service (Nnwdaf_AnalyticsInfo service): refers to Nnwdaf_AnalyticsInfo or an analytics request service in this specification.

The analytics request service may be a service by which the NF makes a request for analyzing specific information and receives a result value immediately when the request is completely processed unlike the aforementioned event subscription service. The operation supported by the analytics information request service includes a request and a response. The NF making a request for analytics information may transmit an analytics information request to the NWDAF.

For example, the NF may provide load level information of a network slice instance, an analytic identification (ID), and additional factors required for analysis to the NWDAF as the mandatory input of the analytics information request. When receiving the request from the NF, the NWDAF may transmit the analytics result to the NF in response to the request. The response may include requested slice load information.

Meanwhile, according to definition of 3GPP Rel-15, only load information of the network slice instance is considered as analytics information provided through the service provided by the NWDAF, but the information provided by the NWDAF is not limited to the load information in the disclosure and may include UE movement information, UE/service communication pattern, an expected moving trajectory of the UE service, an expected UE behavioral parameter, expected QoS/service experience, and/or expected network performance information.

Meanwhile, a method of detecting the service in the exiting 5G mobile communication system may be largely divided into two methods. A first method inserts header matching information for detecting service flow into a service data flow (SDF) template according to the AF or an internal policy. A second method is a method using packet flow description (PFD) for detecting a specific service provided by the AF and, at this time, the PFD may include only a method of purely detecting the service without controlling the specific service, such as a policy and charging control (PCC) rule. The service detected through the PFD may be expressed as an identifier, such as an application identifier in the PCC rule of the PCF or the QoS rule. Actually, an entity which detects service traffic, such as the UPF may apply the PCC rule, which should be actually applied, through a combination of the provided PFD and application identifier. Both the methods have limits in that the AF or the network operator located outside is required to manually configure the rule for detecting the specific service. However, it is difficult to manually configure a rule for detecting all services or provide information to a mobile communication system by all service providers. Accordingly, services to which the detection method is not applied cannot help receiving basic network performance and quality even though the services have different characteristics.

The disclosure proposes a method of automatically detecting the service and analyzing an applying network service quality and performance requirements required by each service. Through the application of the method, the method of detecting the service is not received from the AF located outside, and the efficiency of network operation may be increased and the overall quality level of services may be increased by removing the process of manually configuring the rule. Hereinafter, various embodiments will be described with reference to the drawings.

[First Embodiment]—Collection of User Data for Detecting Service Through UPF

Entities for transmitting user data in a 5G mobile communication system may be largely divided into a UE, a RAN, a UPF, and a DN, and the RAN and the UPF are representative internal entities to control the service quality and performance. The UPF may serve to detect a specific service and apply a QoS-related rule. Accordingly, service traffic is transmitted through the UPF, and the UPF may apply a specific QoS-related policy or a QoS policy. Basically, the basic unit of applying the policy or the rule may be QoS flow. The UPF may detect QoS flow through a packet detection rule (PDR), and the PDR may include a portion of the SDF. Additionally, when the UPF provides a function for the PFD, the SMF may receive the PFD from the NEF and receive detection of the service corresponding to the application identifier through a report generated by the UPF.

In the disclosure, when network traffic to which the PDR rule of the related art is not applied among network traffic transmitted from the UPF is generated or when new QoS flow or network data which cannot be identified by the application identifier of the related art is detected, a process of transmitting the generated traffic to the NWDAF and analyzing the traffic is performed. At this time, only header information of the newly generated flow may be transmitted according to the configuration or the entire packet including payload information containing the actual content may be transmitted to the NWDAF as necessary. Meanwhile, a method by which the NWDAF transmits the request to the UPF is not currently standardized, but may be divided into a method of introducing a new interface of service-based architecture and a method by which the NWDAF approaches a dedicated UPF interface. In the disclosure, an embodiment in which the UPF supports an interface according to the service-based architecture is described, but a similar operation having the same purpose through a dedicated interface may be performed. Such a process is illustrated in FIG. 2.

Figure 2:
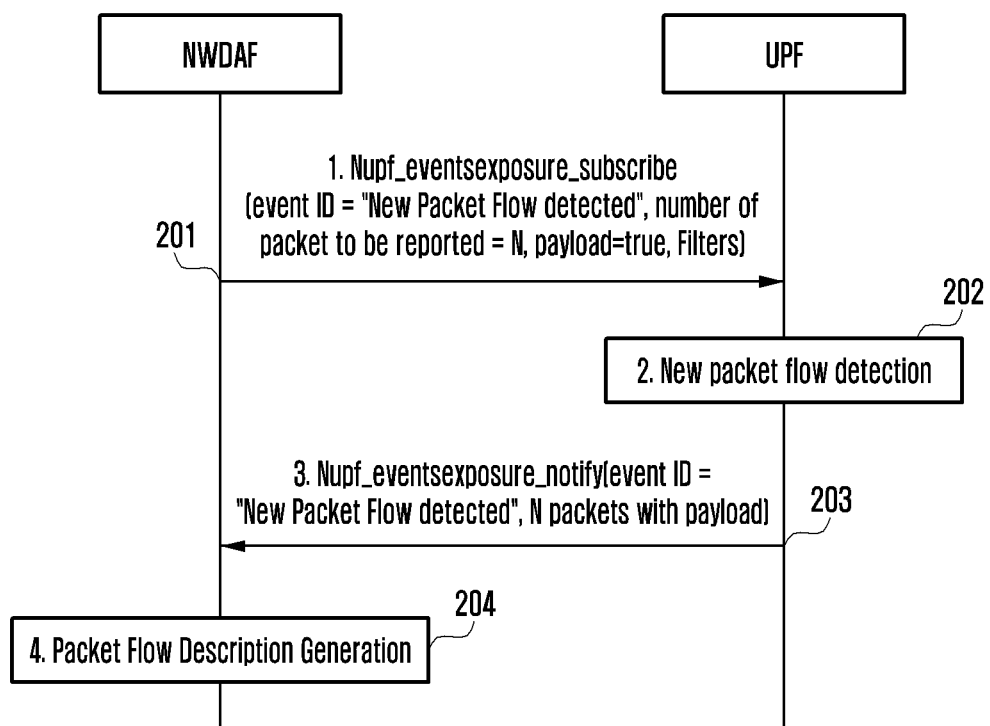
FIG. 2 illustrates a procedure of receiving initial packets of specific packet flow through a user plane function (UPF) according to an embodiment of the disclosure.

FIG. 2 illustrates a procedure of receiving initial packets of specific packet flow through a UPF according to an embodiment of the disclosure.

Referring to FIG. 2, new packet flow may refer to traffic using a specific service as a set of packets. Packet flow may be a specific single server according to a service, or may be expressed in various forms of a large service including a plurality of servers, a combination of a plurality of servers, or movable servers. Accordingly, the packet flow may simply refer to not only a set of packets toward a server located in a specific network address but also all traffics generated when the service is used. Meanwhile, according to an embodiment of the disclosure, the specific service traffic is subdivided and only the traffic toward a single server may be referred to as the packet flow.

In a first process of FIG. 2, when the UPF detects new packet flows, the NWDAF may make a request for subscribing an event for a notification to the UPF in operation 201. For example, the NWDAF may transmit an event subscription request Nupf_eventsexposure_subscribe) to the UPF. Meanwhile, according to an embodiment of the disclosure, when there is no accessible interface between the NWDAF and the UPF, the SMF may transmit the request from the NWDAF.

According to an embodiment of the disclosure, when an event identifier (for example, event ID="New Packet Flow detected") and new packet flow are detected, the event subscription request may include a factor indicating the number of packets included in the packet flow to be transmitted (or reported) to the NWDAF in the detected packet flow (for example, a factor of "number of packets to be reported") and/or a factor indicating whether to insert a payload, which is actual data of the packet, and transmit the packet (for example, a factor of "payload"). In the embodiment of FIG. 2, the new event identifier (for example, event ID="New Packet Flow detected") indicating that the new packet flow is detected is allocated to make a request for notifying of the packet flow, but a dedicated interface for performing the function may be provided. Further, the NWDAF may further transmit filter information for specific traffic. For example, the NWDAF may further insert the filter information for the specific traffic into the event subscription request. According to an embodiment of the disclosure, the filter type may include a UE ID, a group of UEs, a PDU session ID, a DNN or DNAI, an S-NSSAI, and/or a time.

In a second process of FIG. 2, when there is no PDR currently provided from the SMF or when there is not PFD for detecting specific application, the UPF may determine that new packet flow is detected in operation 202. At this time, in the case of a policy or a rule applied to all packets in common, it may be determined that there is no applied rule or filter. Packets which match the basic PCC rule (PCC rule corresponding to the default QoS rule of the UE) or packets which fails in packet matching by the UPF may be detected by new packet flow. Detection of packet flow may be performed using a combination of traffic toward a specific network address or section, traffic generated in a specific time section, traffic generated by a specific UE, and traffic toward a specific DNN in packets included in traffic having no PFD or no PDR. For example, when a set of packets which last for 60 seconds or longer from a specific UE to a specific network address is detected, it may be expressed that new packet flow is detected. Packets included in the detected packet flow may be stored in the UPF or an external specific storage space, and may be stored until the number of packets which satisfy a condition is sufficiently secured. At this time, a time at which the packet is transmitted, a time at which the transmitted packet is stored, and corresponding PDU session information for transmitting the packet may be additionally stored. When a payload is requested when the packet is stored, the payload should be also stored. However, when there is no request, whether to store the payload may vary depending on an internal configuration of the UPF.

In a third process of FIG. 2, the UPF may transmit the packets detected and stored in the second process to the NWDAF in operation 203. At this time, additionally stored information may also be transmitted along with the packets. For example, the stored packets and/or the additionally stored information may be inserted into a response to the event subscription request or a notification (for example, Nupf_eventsexposure_notify) and transmitted.

In a fourth process of FIG. 2, the NWDAF may analyze a method of differentiating and distinguishing a packet group from another service through the received packets in operation 204. For example, the NWDAF may analyze a service related to the packet flow through the received packets and generate PFD for the new packet flow on the basis thereof.

Figure 3:
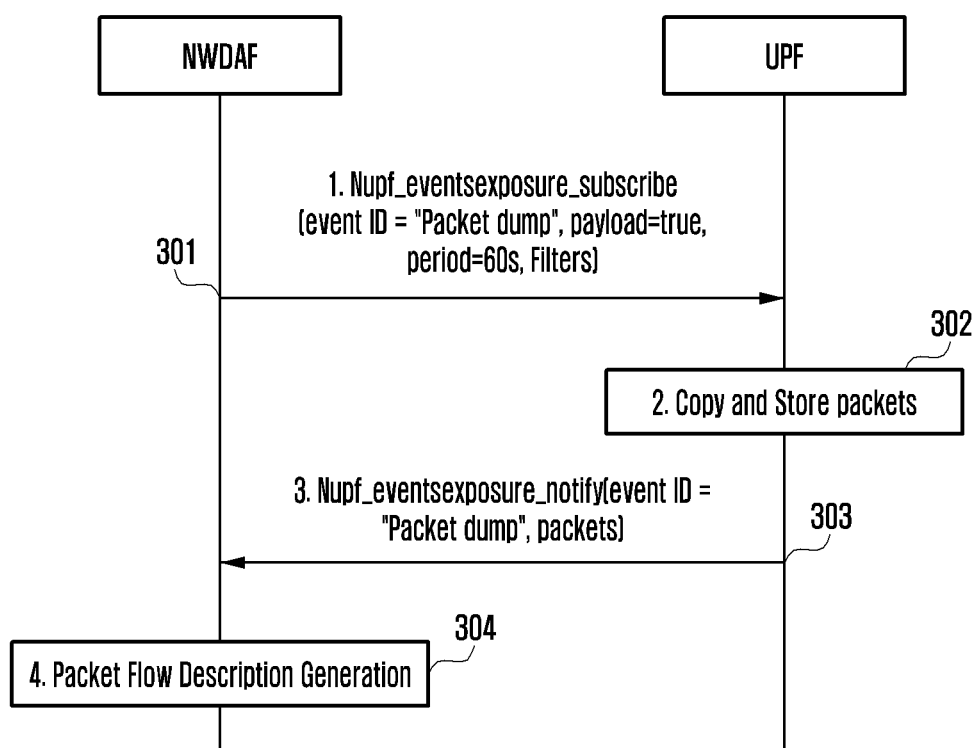
FIG. 3 illustrates a procedure of receiving all specific packets through a UPF according to an embodiment of the disclosure.

FIG. 3 illustrates a procedure of receiving all specific packets through a UPF according to an embodiment of the disclosure.

Referring to FIG. 3, it describes a method of transmitting all traffics generated at a specific time to the NWDAF as a method which can be used when a detection rule of new packet flow is not supported by the UPF.

In a first process of FIG. 3, the NWDAF may make a request for receiving all packets generated for a specific time interval from the UPF to the UPF in operation 301. For example, the NWDAF may transmit an event subscription request Nupf_eventsexposure_subscribe) to the UPF. Meanwhile, according to an embodiment of the disclosure, when there is no accessible interface between the NWDAF and the UPF, the SMF may transmit the request from the NWDAF.

According to an embodiment of the disclosure, the event subscription request may include an event identifier (for example, event ID="packet dump") and/or a factor indicating a specific time interval (for example, a factor of "period"). In addition, the event subscription request may further include a factor indicating whether to include packet payload. Further, the NWDAF may further transmit filter information for specific traffic. For example, the NWDAF may further insert the filter information for the specific traffic into the event subscription request. According to an embodiment of the disclosure, the filter type may include a UE ID, a group of UEs, a PDU session ID, a DNN or DNAI, an S-NSSAI, and/or a time.

In a second process of FIG. 3, the UPF may store all packets which satisfy a condition in an internal or external specific storage space of the UPF in operation 302. In such a process, the UPF may store the packets until the number of packets which satisfy the condition is sufficiently secured. At this time, a time at which the packet is transmitted, a time at which the transmitted packet is stored, and corresponding PDU session information for transmitting the packet may be additionally stored. When a payload is requested when the packet is stored, the payload should be also stored. However, when there is no request, whether to store the payload may vary depending on an internal configuration of the UPF.

In a third process of FIG. 3, the UPF may transmit the packets stored in the second process to the NWDAF in operation 303. At this time, additionally stored information may also be transmitted along with the packets. For example, the stored packets and/or the additionally stored information may be inserted into a response to the event subscription request or a notification (for example, Nupf_eventsexposure_notify) and transmitted.

In a fourth process of FIG. 3, the NWDAF may analyze a method of differentiating and distinguishing a group of the packets from another service through the received packets in operation 304. For example, the NWDAF may analyze a service related to the packet flow through the received packets and generate PFD for the new packet flow on the basis thereof.

[Second Embodiment]—Collection of User Data for Detecting Service Through SMF

The disclosure includes a method of receiving a traffic report transmitted from the SMF and detecting a new service when the NWDAF cannot directly access the UPF. The SMF may configure reception of traffic-related report from the UPF to apply a policy and charge. Basically, monitoring related to the use of traffic of the UPF is performed at a PDU session level, but the SMF may monitor a specific service or activate a monitoring rule that satisfies a specific condition. When the request is generated by the SMF, the UPF may collect, store, and report documents related to a time and a volume of traffic that satisfies the condition. In such a process, the disclosure may include a method of, when the SMF detects new packet flow described in the [First embodiment], inserting payload data including headers of initial packets as well as the time and the volume of the flow into a report and transmitting the report. The process is illustrated in FIG. 4.

Figure 4:
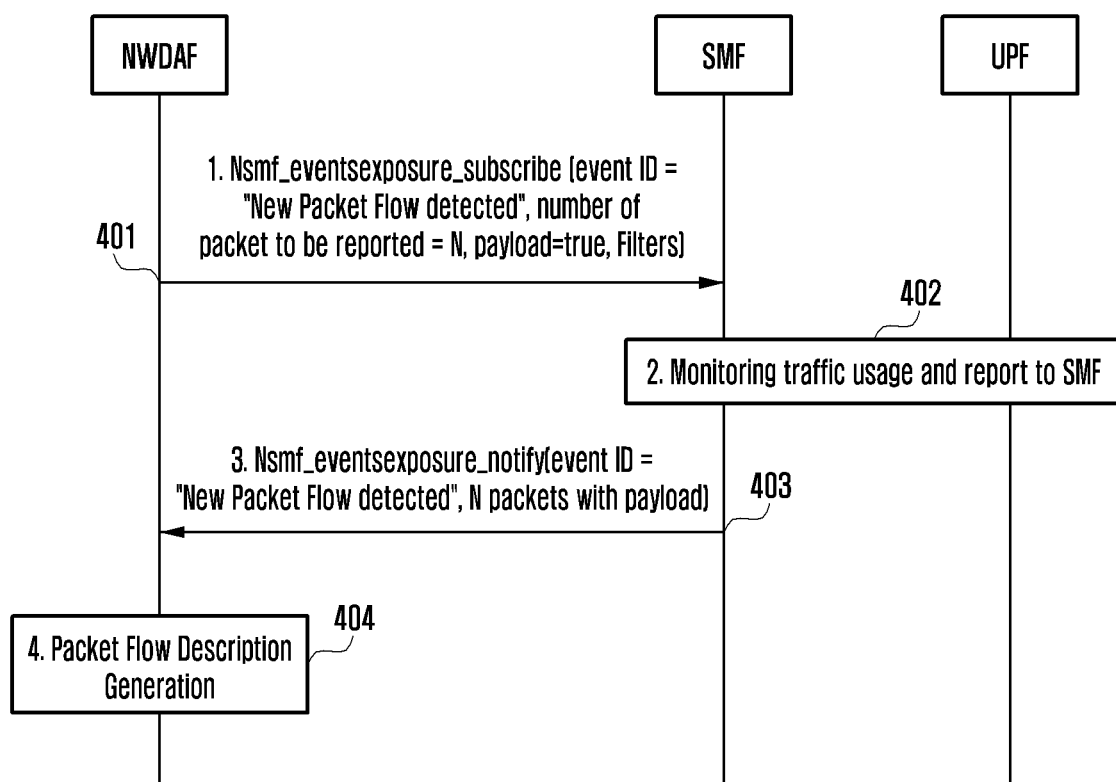
FIG. 4 illustrates a method of detecting new packet flow based on data collected by a network data analytics function (NWDAF) through a session management function (SMF) or a UPF according to an embodiment of the disclosure.

FIG. 4 illustrates a method of detecting new packet flow based on data collected by an NWDAF through an SMF or a UPF according to an embodiment of the disclosure.

Referring to FIG. 4, the NWDAF may make a request for a report on new packet flow to the SMF in operation 401. For example, the NWDAF may transmit an event subscription request (Nupf_eventsexposure_subscribe) to the SMF.

According to an embodiment of the disclosure, when an event identifier (for example, event ID="New Packet Flow detected") and new packet flow are detected, the event subscription request may include a factor indicating the number of packets included in the packet flow to be transmitted (or reported) to the NWDAF in the detected packet flow (for example, a factor of "number of packets to be reported") and/or a factor indicating whether to insert a payload, which is actual data of the packet, and transmit the packet (for example, a factor of "payload"). Although a new event identifier indicating that new packet flow is detected is allocated and a request for notifying of the packet flow is made in the embodiment of FIG. 4, a dedicated interface for performing the function may be provided. Further, the NWDAF may further transmit filter information for specific traffic. For example, the NWDAF may further insert the filter information for the specific traffic into the event subscription request. According to an embodiment of the disclosure, the filter type may include a UE ID, a group of UEs, a PDU session ID, a DNN or DNAI, an S-NSSAI, and/or a time. In addition, when a periodic report is desired, the report period may be included in the event subscription request.

In a second process of FIG. 4, when there is no PDR provided from the NEF (or AF/OAM) or there is not PFD for detecting a specific application, the SMF may determine that new packet flow is detected in operation 402. When the use of traffic corresponding to the flow is detected, the UPF may insert information indicating the use into a traffic usage report generated in the flow and transmit the traffic usage report. Packets included in the detected packet flow may be stored in the UPF or an external specific storage space, and may be stored until the number of packets which satisfy a condition is sufficiently secured. At this time, a time at which the packet is transmitted, a time at which the transmitted packet is stored, and corresponding PDU session information for transmitting the packet may be additionally stored. When a payload is requested when the packet is stored, the payload should be also stored. However, when there is no request, whether to store the payload may vary depending on an internal configuration of the UPF. The stored packets and the amount of use may be reported to the SMF.

In a third process of FIG. 4, the SMF may transmit the traffic usage report made and transmitted from the UPF and the packets detected and stored in the second process to the NWDAF in operation 403. At this time, additionally, the stored information may be also transmitted along with the packets. For example, the traffic usage report, the stored packets and/or the additionally stored information may be inserted into a response to the event subscription request or a notification (for example, Nsmf_eventsexposure_notify) and transmitted.

In a fourth process of FIG. 4, the NWDAF may analyze a method of differentiating and distinguishing a packet group from another service through the received packets in operation 404. For example, the NWDAF may analyze a service related to the packet flow through the received packets and generate PFD for the new packet flow on the basis thereof.

[Third Embodiment]—Method of Flexibly Detecting Service Through PFD Expansion

A method of detecting a service used in a current mobile communication system generally detects a specific service by additionally using some of packet header information based on a network address. However, when the network address or only some of the header information is used, the application to a situation in which header information is continuously changed or a location of a specific server cannot be fixedly limited, such as a cloud computing environment or a P2P environment, is not appropriated. When a network address of a server providing a service is changed or header information of a packet is changed through a change in a used transport protocol, service monitoring rules within the existing mobile communication network cannot be continuously applied. The detection method representatively uses a service data flow (SDF) filter.

Meanwhile, a policy and a rule may be applied by detecting a specific service or application based on the PFD rather than the service. The PFD includes a network address of a server providing a specific service, a port number, some of universal resource locator (URL), a domain name matching reference, and information on an applicable protocol. The PFD may also detect a specific service or application by applying the larger number of references than SDF templates, but the continuous application is not possible when an address or a value used for detection is changed in a cloud environment or an environment, such as a P2P protocol.

In the disclosure, not only the network address but also an additional matching value is inserted into the PFD (or SDF) through expansion of the PFD or the SDF. For example, a DL/UL packet sequence pattern using a service, some of character strings included in packet payload, and/or internal protocol information of a capsulated packet may be used as the additional matching value. The detection reference is expansion of the existing PFD and may be used with a combination of the existing information. The SDF or the PFD may be bound by the SMF in the form of a QoS rule for processing the actual packet by the UPF, and service quality requirements required by the SDF and the PFD may be applied to the UPF.

The DL/UL packet sequence pattern corresponds to a unique transmission pattern according to a service, and may be, for example, a pattern of sequences of UL/DL packets indicating that two or more DL packets always come after one UL packet is transmitted.

Some of the character strings included in the packet payload may refer to a character string indicated in common by all or some packets using the service. At this time, the character string may not have a specific meaning, and a characteristic in the form of a specific document used in the service may be reflected therein.

Internal protocol information of the capsulated packet may be a protocol itself within the TCP or the UDP or a capsule of the protocol for connection in the case of a specific service. For example, protocols, such as a location identifier separation protocol (LISP), a virtual extensible local area network (VXLAN), and a network virtualization using generic routing encapsulation (NVGRE) representatively correspond to protocols for transmitting capsulated packets. It is possible to increase the accuracy of detecting the specific service through a method of matching the protocol using internal header information and some of the internal headers rather than capsulated packet header information.

The embodiment includes a method of detecting a service through a combination of the existing detection reference and the expanded detection reference. For example, "flow using 80 ports toward an address of 1.1.1.* and including a character string of "ABC" in an initial second packet" may be referred to as a new service.

[Fourth Embodiment]—Method by which NEF Receives PFD Information from NWDAF and Provisions PFD Information to UDR Based on the aforementioned embodiment of the disclosure, a method of detecting specific service flow or packet service is disclosed. The embodiment may use the network address and the port number of a server providing a specific service, some of the URL, the domain name matching reference, and information on the applicable protocol, which are the existing detection references used by the PFD. In addition, the expanded detection references described in the [Third embodiment] may be also applied.

When new specific service flow or packet flow is detected through the method, the NWDAF may extract characteristics of flows based on collected information. The characteristics serve as a filter allowing the service flow to be distinguished from other network traffic and may be expressed in the form of PFD. Meanwhile, although the disclosure does not describe a method of extracting characteristics of the flows, the characteristics of the service flows may be extracted by applying a method, for example, artificial intelligence, pattern recognition, or machine learning. The extracted characteristics of the service flow may be expressed in the form of PFD and transmitted to another NF or AF.

When the NEF serving to receive information on the PFD from the AF and transmit the information to the SMF determines that there is new service data having no PFD received from the AF or the received PFD has an error, the NEF may make a request for information on non-classified service flows to which the SDF or the PFD is not applied to the NWDAF. The process is illustrated in FIG. 5.

Figure 5:
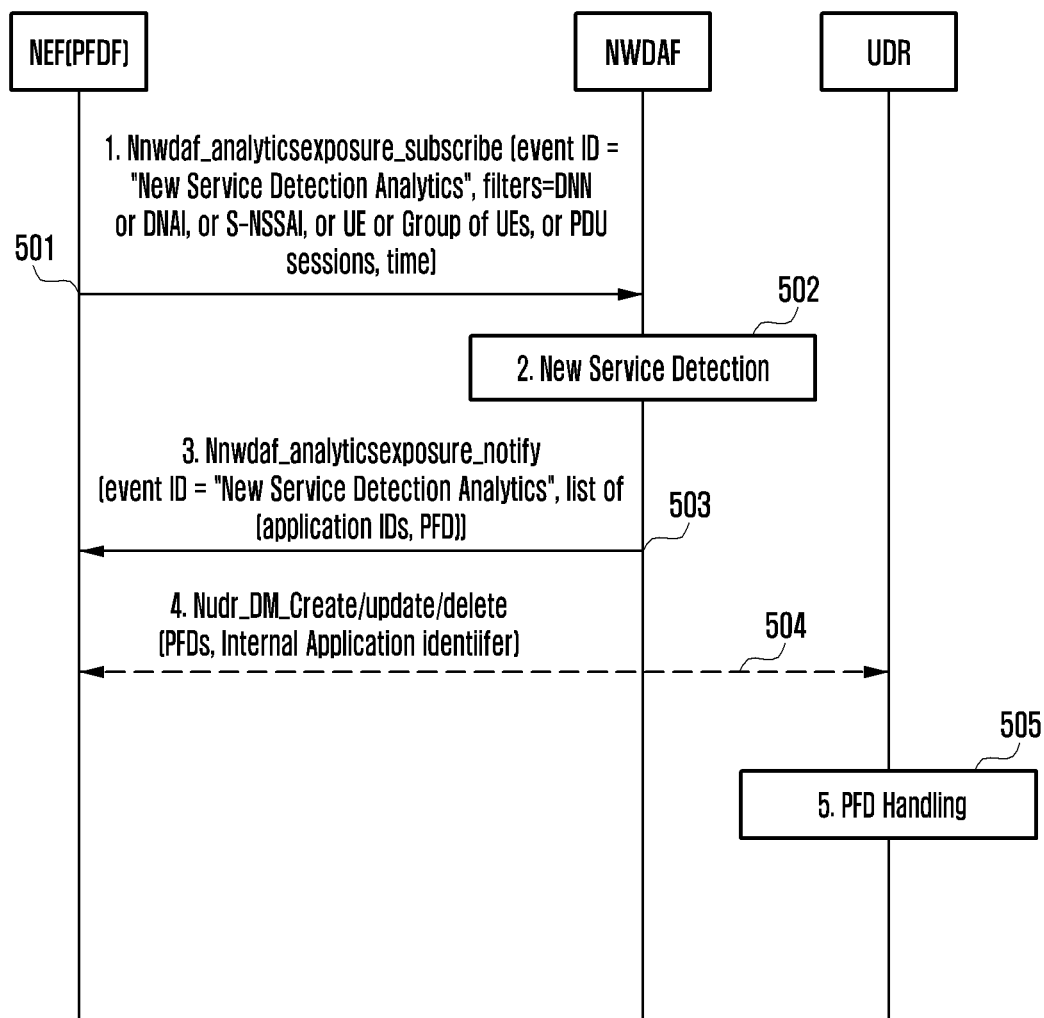
FIG. 5 illustrates a procedure in which a network exposure function (NEF) stores new packet flow detected by an NWDAF according to an embodiment of the disclosure.

FIG. 5 illustrates a procedure in which a NEF stores new packet flow detected by an NWDAF according to an embodiment of the disclosure.

Referring to FIG. 5, the NEF performing a packet flow description function (PFDF) may make a request for analytics information related to detection of a new service to the NWDAF in operation 501. For example, the NEF may transmit an event subscription request (Nnwdaf_analyticsexposure_subscribe) to the NWDAF.

According to an embodiment of the disclosure, the event subscription request may include an event identifier (for example, event ID="New Service Detection Analytics"). Further, a filter may be applied according to a path through which the service is provided or a target to which the service is provided. For example, the event subscription request may further include filter information. According to an embodiment of the disclosure, the filter type may include a UE ID, a group of UEs, a PDU session ID, a DNN or DNAI, an S-NSSAI, and/or a time.

In a second process of FIG. 5, the NWDAF may extract references for detecting new service flow or packet flow corresponding to the filter reference received in the first process and detecting the same in the future in operation 502. Collection of data for extracting information may be performed before or after a request is received.

In a third process of FIG. 5, the NWDAF may convert newly detected service flows into the PFD form and return the same in operation 503. At this time, information for generating the PFD may be sufficiently included, and conversion into the PFD form by the NEF is also possible. Each PFD may have a temporarily allocated application ID. When the application ID is not allocated by the NWDAF, each PFD may be distinguished through and referred to as a temporarily allocated PFD ID.

In a fourth process of FIG. 5, the NEF receiving PFD for new services from the NWDAF may perform a standard procedure for provisioning new PFD in operation 504. At this time, the received PFD may be stored in the UDR. When the application ID is not included in the third process, the NEF may allocate the application ID corresponding to each PFD by applying an internal generation rule.

In a fifth process of FIG. 5, the PFD received from the NWDAF may be stored in the UDR to be used in the future, or when there is an NF subscribing an event related to transmission of the PFD, new PFD may be transmitted to the NF in operation 505.

[Fifth Embodiment]—Method by which AF Receives PFD Information from NWDA and Provisions PFD Information Through NEF In general, the AF may provide a single service, but when a specific address is not used or a service location is changed, such as a cloud, edge computing, or a P2P manager, the AF may not continuously provide specific PFD. Further, a platform provider may not provide PFD for all services provided in the platform. In this case, the AF may acquire PFD for classifying services provided by the AF based on analytics information of the NWDAF provided by a mobile communication system through the NEF, and may provide the PFD to a 5G mobile communication system through the PFDF of the NEF based on the information. In this case, the PFD acquired through the NEF may be applied to an LTE system not only through the NEF but also through the PFDF of LTE. The process is illustrated in FIG. 6.

Figure 6:
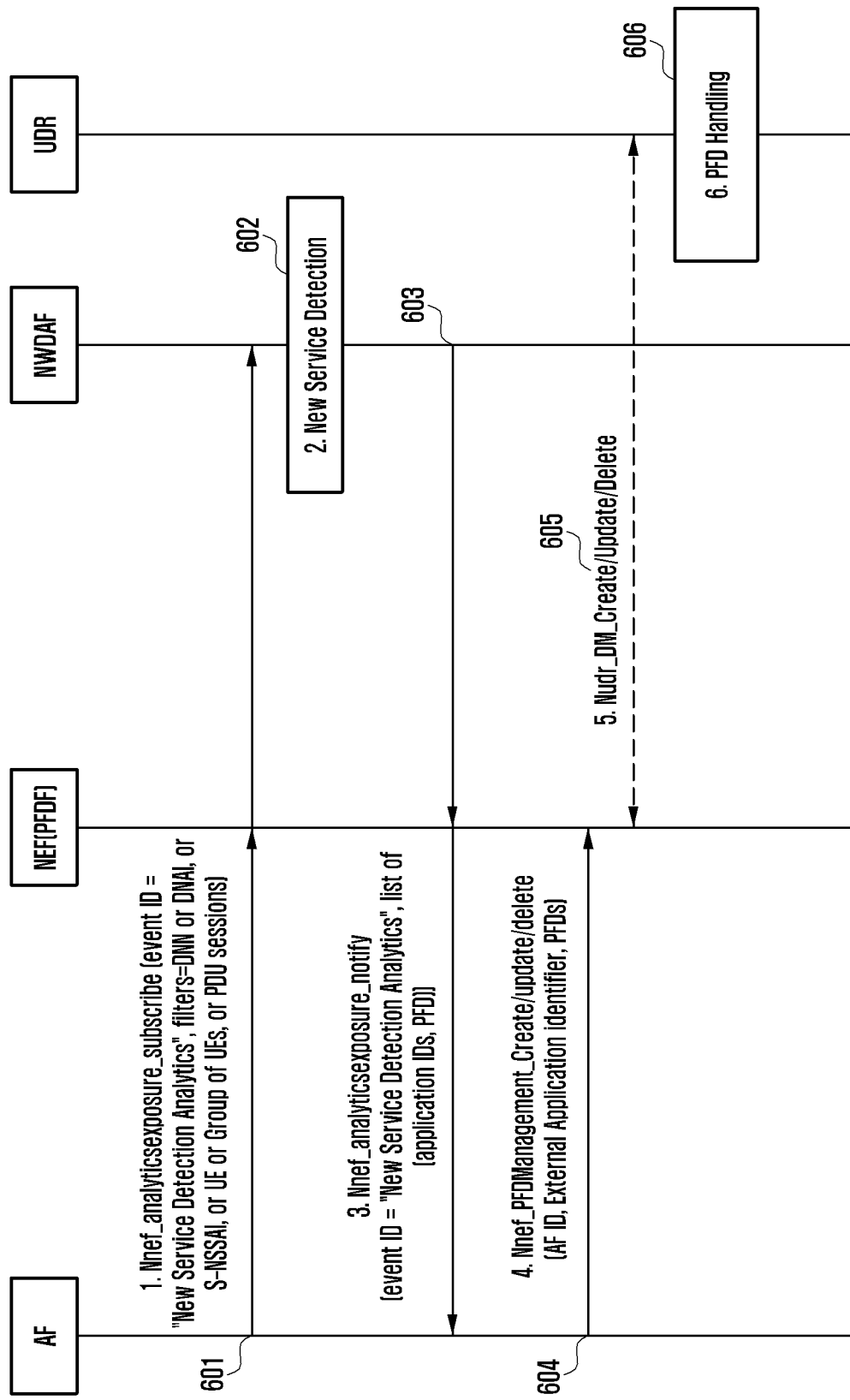
FIG. 6 illustrates a procedure in which an application function (AF) receives analytics information for its own packet flow information according to an embodiment of the disclosure.

FIG. 6 illustrates a procedure in which an AF receives analytics information for its own packet flow information according to an embodiment of the disclosure.

Referring to FIG. 6, the AF may make a request for analytics information related to detection of a new service to the NWDAF through the NEF in operation 601. For example, the AF may transmit an event subscription request (Nnef_analyticsexposure_subscribe) to the NWDAF through the NEF.

According to an embodiment of the disclosure, the event subscription request may include an event identifier (for example, event ID="New Service Detection Analytics"). Further, a filter may be applied according to a path through which the service is provided or a target to which the service is provided. For example, the event subscription request may further include filter information. According to an embodiment of the disclosure, the filter type may include a UE ID, a group of UEs, a DNN or DNAI, an S-NSSAI, and/or a time. As information, such as each UE ID, an identifier used in the outside, such as a GPSI, an MSISDN, or an external ID may be used by the AF, and the NEF may serve to convert the identifier into an identifier used in the inside. At this time, the NEF may reject a request by applying a filter or an internal policy to information which a specific AF cannot access.

In a second process of FIG. 6, the NWDAF may extract references for detecting new service flow or packet flow corresponding to the filter reference received in the first process and detecting the same in the future in operation 602. Collection of data for extracting information may be performed before or after a request is received.

In a third process of FIG. 6, the NWDAF may convert newly detected service flows into the PFD form in operation 603. At this time, information for generating the PFD may be sufficiently included, and conversion into the PFD form by the NEF is also possible. Each PFD may have a temporarily allocated application ID. When the application ID is not allocated by the NWDAF, each PFD may be distinguished through and referred to as a temporarily allocated PFD ID. At this time, the NEF may apply a filter to information which a specific AF cannot access so as to delete the information which the corresponding AF cannot access.

In a fourth process of FIG. 6, the AF receiving PFD for new services from the NEF may perform a standard procedure for provisioning new PFD in operation 604. The AF may perform a function of generating/changing/deleting the PFD provided by the NEF, which may perform the PFDF. Further, in the LTE system, the AF may transmit a request to the PFDF based on the same information and provide a detection rule for services provided by the AF.

Fifth and sixth processes of FIG. 6 may be performed with reference to operations 504 and 505 of FIG. 5 in operations 605 and 606. [Sixth embodiment]—Method by which PCF receives notification of new service detection from NWDAF and generates new PCC rule The PCF may apply a QoS-related policy or a charging policy to each service. The unit for applying the policy may be the QoS flow unit, and the PCF may apply the policy and actual rules in units of QoS flow. In order to support the same, the PCF needs a method of monitoring a service and applying a policy. The PCF may use SDF filter information within an SDF template to identify an SDF or use PFD for detecting a specific application or service through an application ID as a medium. In the disclosure, for services which have not been detected previously, the NWDAF may transmit analytics information including the SDF template for new service detection to the PCF. The PCF may generate a new PCC rule for a new service on the basis thereof. In order to assist the information, the NWDAF may also transmit a general characteristic of the service acquired during network traffic analysis as assistance information. The general characteristic of the service may include a minimum bandwidth, a maximum delay time, and/or an average response time. The process is illustrated in FIG. 7.

Figure 7:
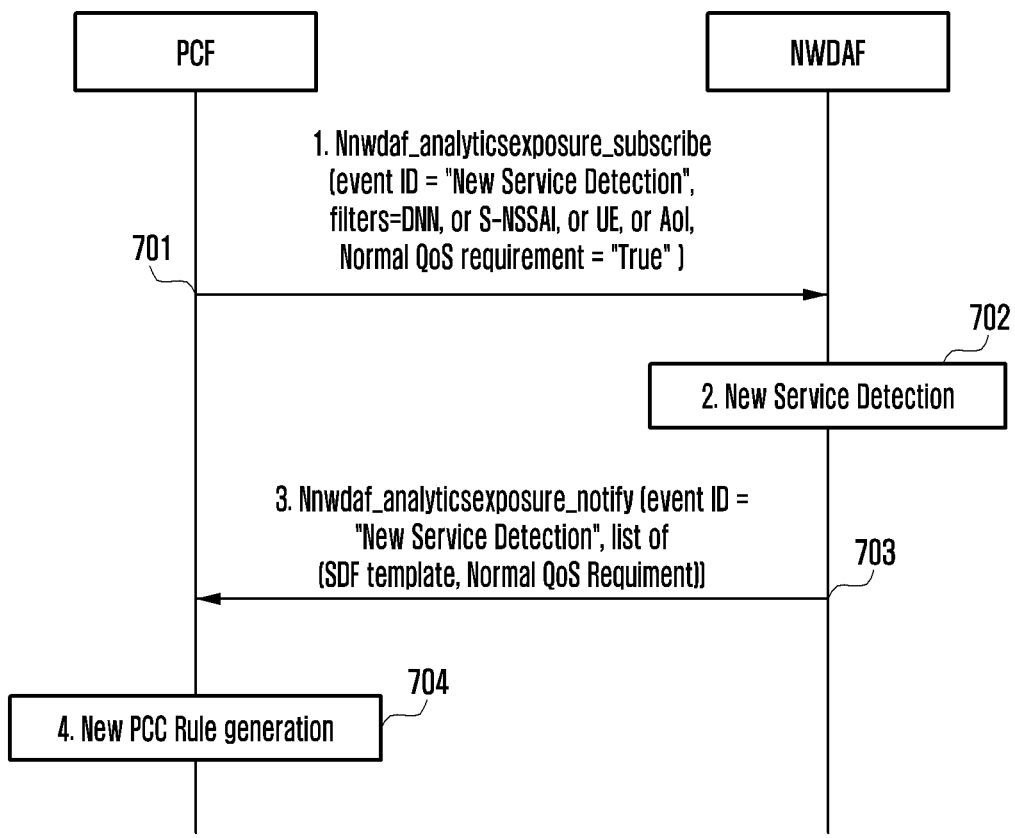
FIG. 7 illustrates a procedure of receiving a notification when a policy changing function (PCF) detects a new service according to an embodiment of the disclosure.

FIG. 7 illustrates a procedure of receiving a notification when a PCF detects a new service according to an embodiment of the disclosure.

Referring to FIG. 7, the PCF may make a request for analytics information related to detection of a new service to the NWDAF in operation 701. For example, the PCF may transmit an event subscription request (Nnwdaf_analytics-exposure_subscribe) to the NWDAF.

According to an embodiment of the disclosure, the event subscription request may include an event identifier (event ID="New Service Detection"). Further, a filter may be applied according to a path through which the service is provided or a target to which the service is provided. For example, the event subscription request may further include filter information. According to an embodiment of the disclosure, the filter type may include a UE ID, a group of UEs, a DNN or DNAI, an S-NSSAI, and/or a time. In addition, the filter type may include information indicating whether quality and performance requirements required to provide a seamless service are needed by analyzing a traffic pattern of the newly detected service.

In a second process of FIG. 7, the NWDAF may extract references for detecting new service flow or packet flow corresponding to the filter reference received in the first process and detecting the same in the future in operation 702. Collection of data for extracting information may be performed before or after a request is received. An average bandwidth of newly detected services based on received traffic-related information, an average use time based on a delay time and whether flow continues, a minimum bandwidth required to provide a service, and a maximum delay time may be additionally detected.

In a third process of FIG. 7, the NWDAF may convert newly detected service flows into the form of an SDF template and return the same in operation 703. The newly detected services may be transmitted while including assistance service quality and performance requirements related to provision of the analyzed services in the second process. Accordingly, output information may be expressed in the form of a pair of the SDF template for service detection and the QoS-related requirements, and the number of pieces of information may be one or more. At this time, when filter information for detecting the service by the SDF is expressed as an application identifier, the same method may be performed after the PFD and the application ID are allocated.

In a fourth process of FIG. 7, the PCF may generate, delete, and change a PCC rule for new services based on analytics information received from the NWDAF in operation 704. The applied PCC rule may be applied by complexly considering factors, such as an internal policy, AF requirements, and the current network state.

[Seventh Embodiment]—Method by which NWDAF Collects Characteristics of Service Flow Through UPF In a 3GPP mobile communication system, the UPF may serve to detect traffic generated in the UE or an external data network and process the traffic according to a rule, and may representatively perform forwarding, dropping, and reporting functions. As a minimum unit for separating and managing traffic by the UPF, QoS flow may be used. The QoS flow may be bound and managed through service flow specifying each service or an application ID. Accordingly, in order to collect characteristics of service flow, QoS flow bound with a specific service should be found, and characteristics of the service on the network may be detected through detection of traffic characteristics of the target QoS flow. In addition, the UPF may collect, analyze, and provide information on specific service flow by applying a packet filter to the QoS flow. Examples of the service flow may include a flow maintenance time (length), a flow size, a maximum transmission amount (burstiness) for a unit time, information indicating whether traffic is transmitted continuously or intermittently (on/off pattern), distribution of a packet size, a transmission time between packets (inter arrival time), an average packet size, and a transmission rate per second. Each piece of information can be collected and analyzed for each uplink and each downlink.

In order to collect the information, the disclosure provides a method by which the UPF collects information of required QoS flow through a service-based interface (SBI) and reports the information to the NF. The collected information aims at differentiating performance of a specific service depending on each DNAI, and intends to find a service optimization path for each general DNAI by accumulating time data for a long time. At this time, an embodiment of the disclosure, such as analysis of the performance of the specific service for each DNAI for the past week may be applied as a characteristic.

As a condition for a report by the UPF, information indicating whether the specific service and QoS flow are bound should be detected. In order to make a request for information on QoS flow to the UPF, a QoS flow identifier (QFI) should be first detected. For the information, a specific UE should detect a PDU session ID used to provide the connection with the corresponding SDF based on filter information within the service data flow (SDF) template that matches a specific service and know 5G QoS identifier (5QI) information used by the UPF through detection of QoS of the specific service. In this case, when a subject to collect flow is traffic toward the entire DN, information on traffic of the UE from the UPF to a specific DN may be collected using a PDU session ID as a factor. An operation in which a specific UPF collects traffic information may be divided as follows. The traffic may be divided into 1) all traffics (first traffic) passing through a specific UPF, 2) traffic (second traffic) connected to a specific DN via a specific UPF, 3) traffic (third traffic) generated by a specific UE via a specific UPF, 4) traffic (PDU session) (fourth traffic) toward a specific DN, generated by a specific UE via a specific UPF, 5) traffic (service data flow) (fifth traffic) toward a specific server or domain through a specific DN, generated by a specific UE via a specific UPF, and 6) traffic (sixth traffic)

toward a specific server or domain through a specific DN via a specific UPF. In the embodiment of the disclosure, a target to be used is to collect differences in the characteristic of traffic toward a specific server for each DNAI and aims at collecting no. 6 traffic type. However, a method of collecting all types of traffic may be supported for the purpose of collecting a set of various applications used by a specific network domain or a specific UE rather than a specific server and the purpose of detecting the performance of a specific UPF.

Factors required according to the collection type of traffic may be divided into 1) a UPF ID for first traffic, 2) a UPF ID and a DNAI for second traffic, 3) a UPF ID and a UE ID (for example, a UE IP address) for third traffic, 4) a UPF ID, UE ID, and a PDU session ID for fourth traffic, 5) a UPF ID, a UE ID, a PDU session ID, and a server address for fifth traffic, and 6) a UPF ID and a server ID for sixth traffic. In the following embodiment of the disclosure, the factor for dividing traffic into such forms may be referred to as the term "packet flow description". Such an identifier may have additional information used for the same purpose. An N4 session ID used by a specific SMF to manage a specific PDR, a source or a destination interface for limiting a specific path, an application ID used to detect traffic of a specific application, a QoS flow ID (QFI) used to refer to specific QoS flow, a data network name (DNN) for identifying a data network, and/or an S-NSSAI for identifying a slice may be additionally included in the packet flow description and requested.

There are various methods by which the UPF collecting information on the flow corresponding to the packet flow description transmits a report to the NF making a request for collecting the flow. For example, the form in which the UPF transmits the report is described below. The report may be transmitted 1) when requested packet flow is detected, 2) when requested packet flow is maintained for a specific time or longer, 3) when an amount of the use of requested packet flow exceeds a specific size, 4) when a transmission rate of requested packet flow passes a specific value, 5) when requested packet flow is not used for a specific time, 6) when a report is periodically transmitted according to a specific period, 7) when a path is changed, 8) when a rule, such as QoS is changed, or 9) during a specific time interval.

Figure 8:
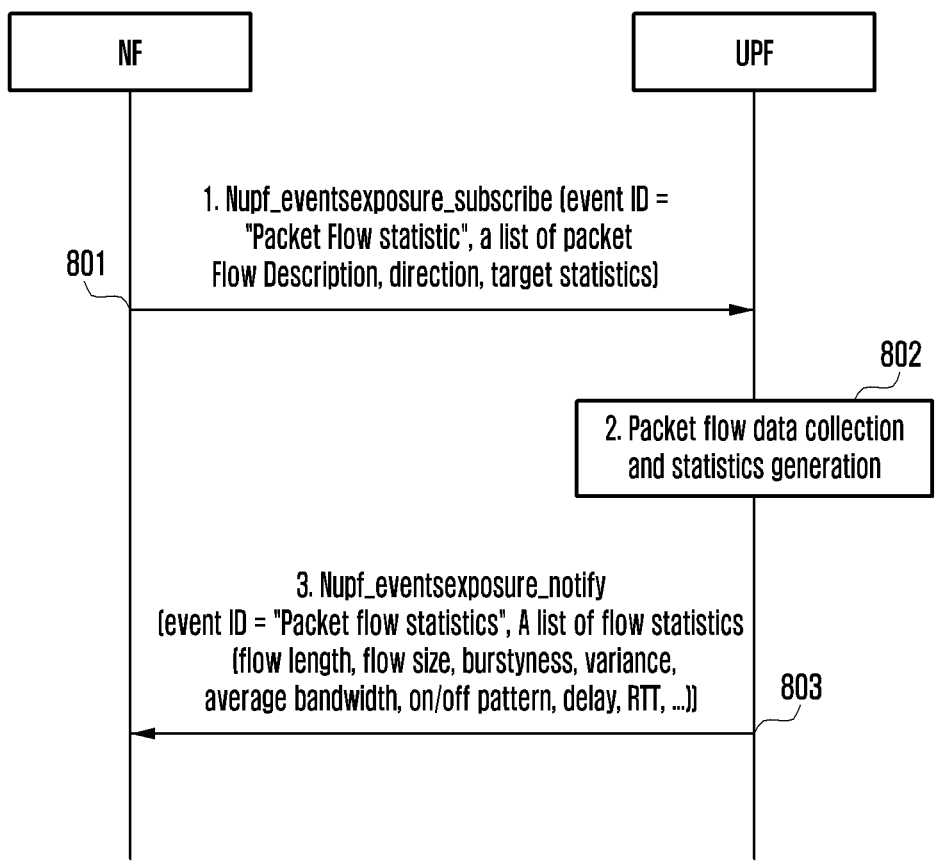
FIG. 8 illustrates a procedure of collecting information on packet flow from a UPF according to an embodiment of the disclosure.

A process in which the NF for collecting traffic in such a form transmits a request to the UPF is illustrated in FIG. 8.

FIG. 8 illustrates a procedure of collecting information on packet flow from a UPF according to an embodiment of the disclosure.

Referring to FIG. 8, a consumer NF (for example, NWDAF) may make a request for a characteristic of packet flow corresponding to specific packet flow description to the UPF in order to detect a characteristic of specific service or traffic of interest in operation 801. At this time, the consumer NF may transmit target packet flow description and, when the transmission is omitted, may analyze and report flow information for all traffics passing through a specific UPF. In addition, the consumer NF may also transmit a factor (for example, a factor of "direction") for identifying a direction of traffic to distinguish between uplink and downlink traffic. Last, the consumer NF may selectively make a request for traffic collection information (for example, target statistics") to be reported and, when the request is omitted, the UPF may collect and transmit all pieces of information which can be provided. The request may be a request in a list form (for example, a list of PFD) for not only a single packet flow but also a plurality of packet flows, and may additionally include a notification correlation ID for receiving the division and report, a notification address, and configuration values related to a report. The configuration values related to the report may include a periodic report, a report for a specific time, the specific number of event reports, an aggregation level of information, and/or a sampling range. At this time, a response to the request, such as a subscription correlation ID, may be transmitted to the NF. The information may be used to identify that the corresponding response is a response to the currently transmitted request in the process of transmitting the response to the request or the notification in the third operation.

In a second operation of FIG. 8, the UPF may select packets corresponding to packet flow requested in the first operation, directly collect or extract packets during a process of processing some of header information, and collect information required for generating a response to the request from the packets in operation 802. Further, when a requested report condition is satisfied, requested analytics information may be organized based on the information collected up to the present and reported to a requestor.

In a third operation of FIG. 8, the UPF may transmit an analytics result as a response to the NF making a request for analyzing packet flow in operation 803. At this time, the response may include one piece or a plurality of pieces of analytics information according to a request form. Each piece of information may be determined through collection, measurement, or analysis of the value requested in the first operation. In addition, the notification correlation ID transmitted to the consumer NF in the first operation may be included in the response and thus the consumer NF may identify which request corresponds to the response.

Through the embodiment of the disclosure, the consumer NF may collect information on a single specific service flow of and extract information on characteristics of respective one-time flows. When service flow or QoS flow is generated through a combination with the embodiment of the disclosure, N packets initially transmitted and received on the flow may be collected, and the consumer NF may be also used to analyze a characteristic of traffic.

When the UPF cannot directly provide the SBI to the NF, the SMF may serve as a medium for transmitting a request from the NF consumer to perform the same function for UPFs managed by the SMF, and a simple statistic technique (average/variance calculation, detection of flow on/off, and driving of an inactivity timer) may be performed by the SMF. In this case, information provided to the consumer NF may be the same as the above description.

[Eighth Embodiment]—Method by which PCF Selects DNAI in Consideration of Network Quality for Each DNAI Through NWDAF The disclosure includes a method by which the NWDAF analyzes a characteristic of a DNAI for each service by collecting information on a service or QoS flow from the UPF through the above-described method. The 3GPP 5G core network may operate a plurality of DNAIs connected through a specific DNN, and a path to the Internet or a destination server within the DN may be additionally provided even through the DNN is different. Accordingly, in the service flow to a specific server, a network characteristic between the server and each UPF may vary depending on the location of a PDU session anchor (PSA) finally selected according to selection of the DNN and the DNAI. The network characteristic may include, for example, a delay of an interval between the server and the UPF, an error rate, jitter, a bandwidth, a round trip time, a maximum transmission packet size (maximum transmission unit), and the number of intermediate path devices (hop count), which influences transmission of a packet from the UPF to the server and occupies an important part of the interval between end points of the UE and the server.

In order to analyze network performance within the DN for each DNN or each DNAI, the NWDAF may collect a packet through the method or indicate a report of packet characteristics to collect users or service traffics from the UPF.

The NF using the characteristic for each DNN or each DNAI should provide traffic filter information for limiting target service or user traffic, and the transmission form of the traffic filter may be, for example, 1) service data flow template (SDFT) or filter (SDFF), 2) application ID, 3) packet filter set, or 4) packet flow description (PFD). The service data flow is a filter related to head information at the end of the packet. Representatively, the form of 5-tuple (source IP address, destination IP address, source port number, destination port number, and protocol) may be used, and information which can be used in the header, such as a virtual local area network (VLAN) ID, may be additionally combined and used. When a rule for detecting the application is provisioned to the UPF or the SMF, a specific service may be detected through an application ID. The packet filter set is a filter which can be used to apply a QoS rule to the UPF and may be, for example, a filter which can be applied to an IP and an Ethernet packet. Last, the packet flow description is a filter including a server-related address provided by a specific AF to detect specific traffic flow, a URL, and a domain name, and may be generally used after being mapped to the application ID.

Figure 9:
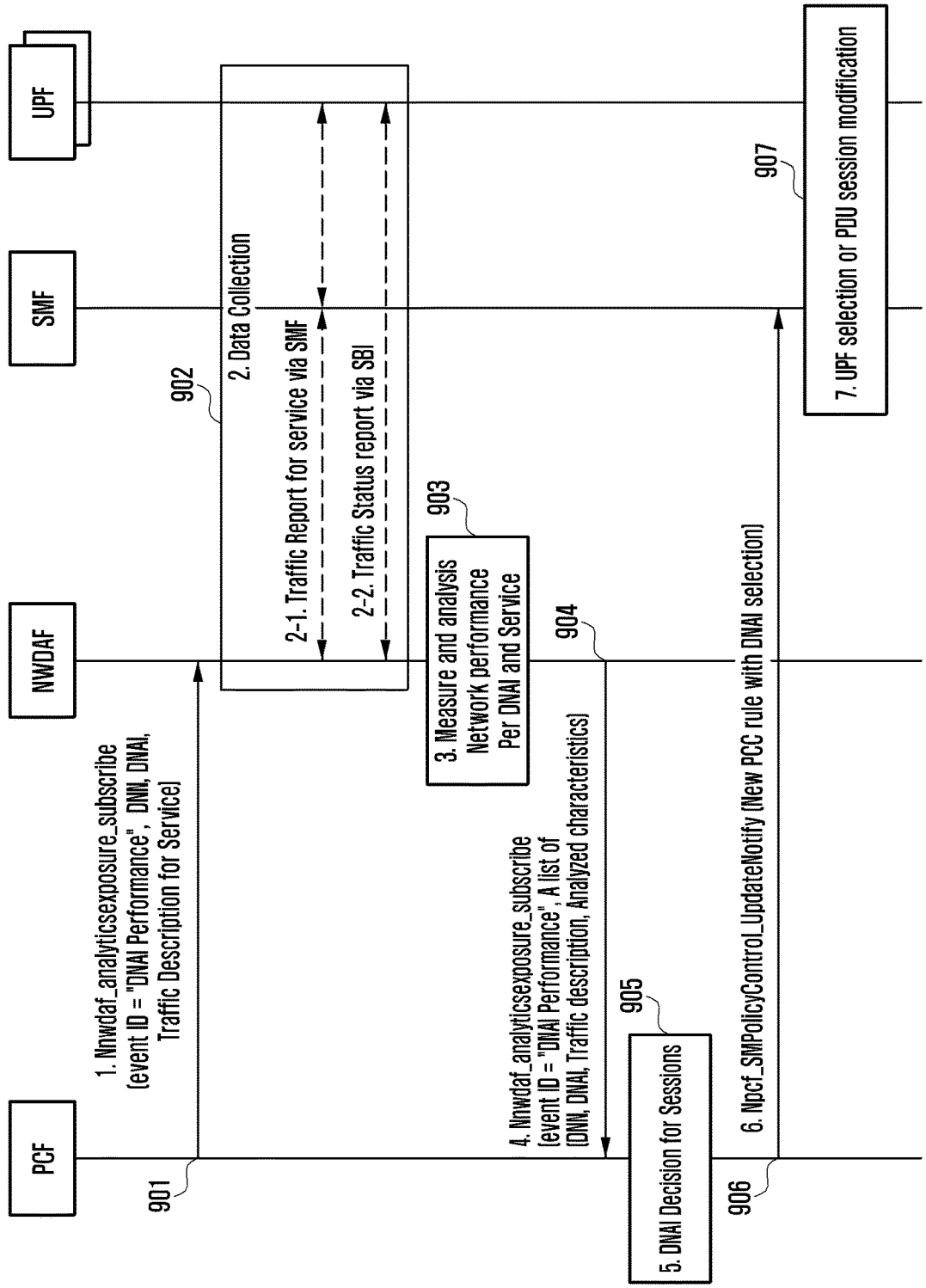
FIG. 9 illustrates a procedure in which a PCF selects an optimal data network access identification (DNAI) for a specific service according to an embodiment of the disclosure.

A procedure in which the PCF selects a DNAI through the disclosure is illustrated in FIG. 9.

FIG. 9 illustrates a procedure in which a PCF selects an optimal DNAI for a specific service according to an embodiment of the disclosure.

Referring to FIG. 9, the PCF may transmit traffic-related information for detecting traffic of an analytics service to make a request for analyzing performance for each DNN or each DNAI to the NWADF in operation 901. The traffic-related information may include a combination of SDFT, SDFF, application, packet filter set, and/or PFD, and the DNN and the DNAI may also be included and requested as selective factors to limit the DNN or the DNAI of interest.

In a second operation of FIG. 9, the NWDAF receiving the request from the PCF may collect traffic-related information from the SMF or the UPF in order to collect information related to service traffic for each DNN and each DNAI based on the requested information in operation 902. Operation 2-1 may use a method of making a request for collecting information related to service traffic from the SMF, and operation 2-2 may collect information related to service traffic through an SBI provided by the UPF. Operations 2-1 and 2-2 may be selectively used, or a combination thereof may be used by a collection method through the SMF in the case of the UPF that cannot provide the direct SBI according to a situation. When specific DNN and DNAI are included in the first operation, the NWDAF may make a request for collecting traffic-related information only to the UPF or the SMF supporting the same. At this time, in a process in which the NWDAF finds the UPF and the SMF related to a specific service, information stored in the UDM may be used or a process of finding the UPF and the SMF through the NRF may be additionally performed.

Meanwhile, according to an embodiment of the disclosure, the second operation of FIG. 9 may be omitted when the NWDAF has already collected analytics information from the UPF or the SMF.

In a third operation of FIG. 9, the NWDAF may analyze a characteristic for each DNAI or each DNN of service traffic collected from the UPF or the SMF and analyze performance of the DN according to each DNN or DNAI in operation 903. At this time, information which can be analyzed may include a delay in an interval between the server and the UPF, an error rate, a jitter, a bandwidth, a round trip time, a maximum transmission packet size (maximum transmission unit), and/or the number of intermediate path devices (hop count).

A fourth operation of FIG. 9 is an operation of transmitting information analyzed by the NWDAF to the PCF making a request for analysis. When paths having different service flows for each DNN or each DNAI are selected, the NWDAF may configure each of the traffic characteristics of the analyzed external DN in the form of a list and transmit the traffic characteristics to the AF through the PCF in operation 904.

In a fifth operation of FIG. 9, the PCF may select an optimal DNAI for a specific service based on information for each DNN or DNAI received from the NWDAF in operation 905. In such a process, an optimal DNAI may be selected in consideration of all services through analysis of optimal performance of all services provided in a PDU session in which not only a specific service but also the current service is provided. Further, when a specific service moves to a specific DNAI without movement of a PDU session, the PDU session may be changed to use a plurality of PDU session anchors (PSAs) by installing an uplink classifier (UL CL) or a branching point (BP).

In a sixth operation of FIG. 9, the PCF may transmit a new PCC rule to the SMF through generation or a change in an SM policy in order to change the UPF for the PDU session in operation 906.

In a seventh operation of FIG. 9, the SMF and the UPF may perform an operation of changing the specific PDU session in operation 907.

[Ninth Embodiment]—Method by which the AF Selects a DNAI in Consideration of a Network Quality for Each DNAI Through the NWDAF The disclosure includes a method of analyzing a characteristic of a DNAI for each service by collecting information on a service or QoS flow from the UPF through the above-described method. The 3GPP 5G core network may operate a plurality of DNAIs connected through a specific DNN, and a path to the Internet or a destination server within the DN may be additionally provided even through the DNN is different. Accordingly, in the service flow to a specific server, a network characteristic between the server and each UPF may vary depending on the location of a PDU session anchor (PSA) finally selected according to selection of the DNN and the DNAI. The network characteristic may include, for example, a delay of an interval between the server and the UPF, an error rate, jitter, a bandwidth, a round trip time, a maximum transmission packet size (maximum transmission unit), and the number of intermediate path devices (hop count), which influences transmission of a packet from the UPF to the server and occupies an important part of the interval between end points of the UE and the server.

In order to analyze network performance within the DN for each DNN or each DNAI, the NWDAF may collect a packet through the method or indicate a report of packet characteristics to collect users or service traffics from the UPF.

The NF using the characteristic for each DNN or each NDAI should provide traffic filter information for limiting target service or user traffic, and the transmission form of the traffic filter may be, for example, 1) service data flow template (SDFT) or filter (SDFF), 2) application ID, 3) packet filter set, or 4) packet flow description (PFD). The service data flow is a filter related to head information at the end of the packet. Representatively, the form of 5-tuple (source IP address, destination IP address, source port number, destination port number, and protocol) may be used, and information which can be used in the header, such as a VLAN ID, may be additionally combined and used. When a rule for detecting the application is provisioned to the UPF or the SMF, a specific service may be detected through an application ID. The packet filter set is a filter which can be used to apply a QoS rule to the UPF and may be, for example, a filter which can be applied to an IP and an Ethernet packet. Last, the packet flow description is a filter including a server-related address provided by a specific AF to detect specific traffic flow, a URL, and a domain name, and may be generally used after being mapped to the application ID.

Figure 10:
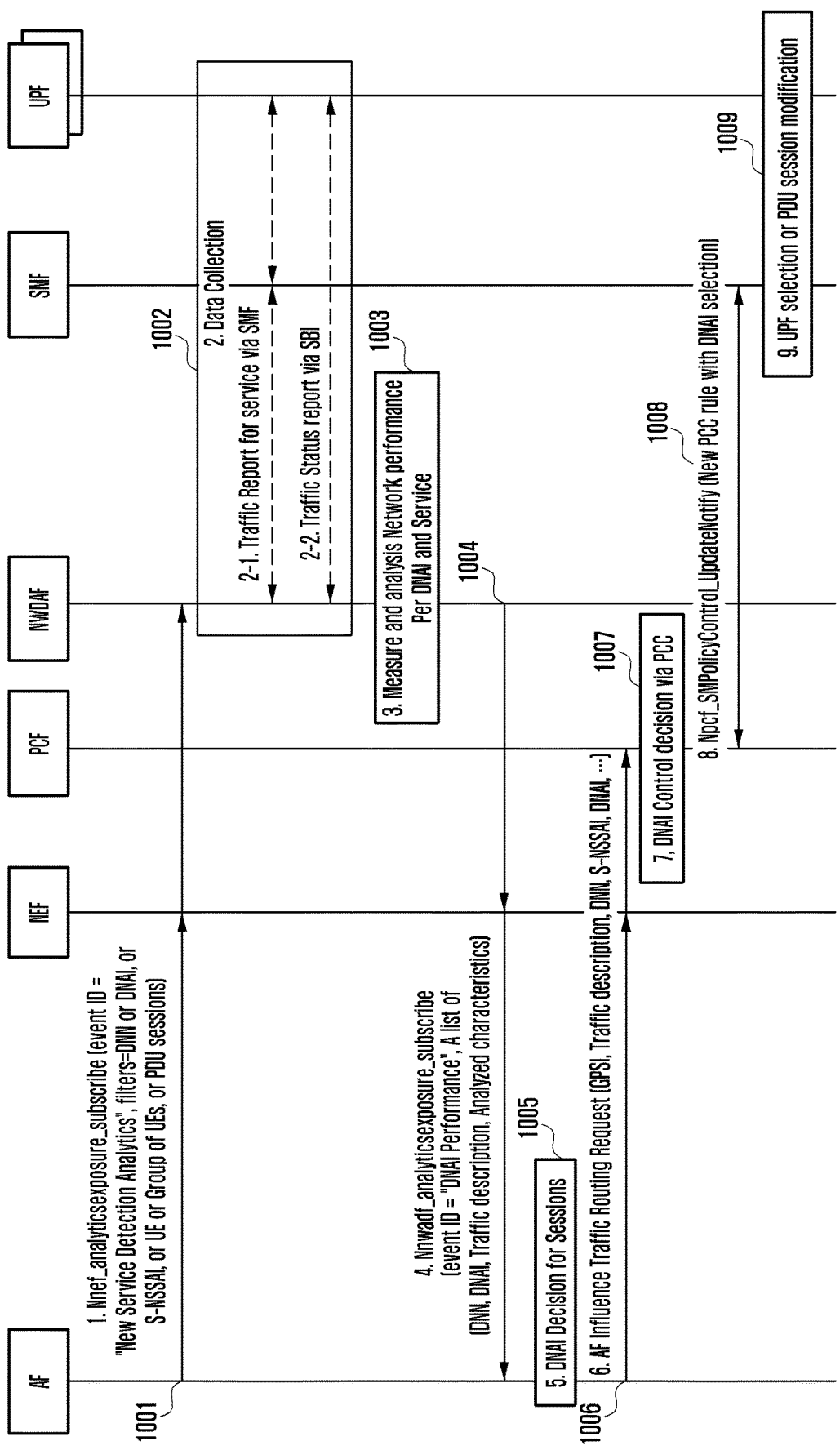
FIG. 10 illustrates a procedure in which an AF selects an optimal DNAI for its own service and makes a request for routing according to an embodiment of the disclosure.

A procedure in which the AF uses the disclosure is illustrated in FIG. 10.

FIG. 10 illustrates a procedure in which an AF selects an optimal DNAI for its own service and makes a request for routing according to an embodiment of the disclosure.

Referring to FIG. 10, the AF may transmit traffic-related information for detecting traffic of an analytics service to make a request for analyzing performance for each DNN or each DNAI to an NWADF via an NEF in operation 1001. The traffic-related information may include a combination of SDFT, SDFF, application, packet filter set, and/or PFD, and the DNN and the DNAI may also be included and requested as selective factors to limit the DNN or the DNAI of interest. Further, the NEF may perform authentication related to information indicating whether the AF can acquire analytics information before transmitting the request from the AF to the NWDAF.

In a second operation of FIG. 10, the NWDAF receiving the request from the NEF may collect traffic-related information from the SMF or the UPF in order to collect information related to service traffic for each DNN and each DNAI based on the requested information in operation 1002. Operation 2-1 may use a method of making a request for collecting information related to service traffic from the SMF, and operation 2-2 may collect information related to service traffic through an SBI provided by the UPF. Operations 2-1 and 2-2 may be selectively used, or a combination thereof may be used by a collection method through the SMF in the case of the UPF that cannot provide the direct SBI according to a situation. When specific DNN and DNAI are included in the first operation, the NWDAF may make a request for collecting traffic-related information only to the UPF or the SMF supporting the same. At this time, in a process in which the NWDAF finds the UPF and the SMF related to a specific service, information stored in the UDM may be used or a process of finding the UPF and the SMF through the NRF may be additionally performed.

Meanwhile, according to an embodiment of the disclosure, the second operation of FIG. 10 may be omitted when the NWDAF has already collected analytics information from the UPF or the SMF.

A third operation of FIG. 10 may be an operation in which the NWDAF analyzes a characteristic for each DNAI or each DNN of service traffic collected from the UPF or the SMF and analyzes performance of the DN according to each DNN or DNAI in operation 1003. At this time, information which can be analyzed may include a delay in an interval between the server and the UPF, an error rate, a jitter, a bandwidth, a round trip time, a maximum transmission packet size (maximum transmission unit), and/or the number of intermediate path devices (hop count).

A fourth operation of FIG. 10 is an operation of transmitting information analyzed by the NWDAF to the AF through the NEF making a request for analysis. When paths having different service flows for each DNN or each DNAI are selected, the NWDAF may configure each of the traffic characteristics of the analyzed external DN in the form of a list and transmit the traffic characteristics to the AF through the NEF in operation 1004.

In a fifth operation of FIG. 10, the AF may select an optimal DNAI for providing its own service based on information for each DNN or DNAI received from the NWDAF in operation 1005.

In a sixth operation of FIG. 10, the AF may insert the DNAI selected by the AF into an AF influence traffic routing request and transmit the request through the NEF in order to provide the service or traffic of the AF through the specific DNAI in operation 1006. At this time, not only the DNAI but also factors which can be included in the request defined in the 3GPP may be also transmitted.

In a seventh operation of FIG. 10, the PCF may select the DNAI of a specific PDU session or service in consideration of the AF influence traffic routing transmitted by the AF in operation 1007.

In an eight operation of FIG. 10, the PCF may transmit a new PCC rule to the SMF through generation or a change in an SM policy in order to change the UPF for the PDU session in operation 1008.

In a ninth operation of FIG. 10, the SMF and the UPF may perform an operation of changing the specific PDU session in operation 1009.

[Tenth Embodiment]—Method by which the SMF Selects a DNAI in Consideration of a Network Quality for Each DNAI Through the NWDAF The disclosure includes a method of analyzing a characteristic of a DNAI for each service by collecting information on a service or QoS flow from the UPF through the above-described method. The 3GPP 5G core network may operate a plurality of DNAIs connected through a specific DNN, and a path to the Internet or a destination server within the DN may be additionally provided even through the DNN is different. Accordingly, in the service flow to a specific server, a network characteristic between the server and each UPF may vary depending on the location of a PDU session anchor (PSA) finally selected according to selection of the DNN and the DNAI. The network characteristic may include, for example, a delay of an interval between the server and the UPF, an error rate, jitter, a bandwidth, a round trip time, a maximum transmission packet size (maximum transmission unit), and the number of intermediate path devices (hop count), which influences transmission of a packet from the UPF to the server and occupies an important part of the interval between end points of the UE and the server.

In order to analyze network performance within the DN for each DNN or each DNAI, the NWDAF may collect a packet through the method or indicate a report of packet characteristics to collect users or service traffics from the UPF.

The NF using the characteristic for each DNN or each NDAI should provide traffic filter information for limiting target service or user traffic, and the transmission form of the traffic filter may be, for example, 1) service data flow template (SDFT) or filter (SDFF), 2) application ID, 3) packet filter set, or 4) packet flow description (PFD). The service data flow is a filter related to head information at the end of the packet. Representatively, the form of 5-tuple (source IP address, destination IP address, source port number, destination port number, and protocol) may be used, and information which can be used in the header, such as a VLAN ID, may be additionally combined and used. When a rule for detecting the application is provisioned to the UPF or the SMF, a specific service may be detected through an application ID. The packet filter set is a filter which can be used to apply a QoS rule to the UPF and may be, for example, a filter which can be applied to an IP and an Ethernet packet. Last, the packet flow description is a filter including a server-related address provided by a specific AF to detect specific traffic flow, a URL, and a domain name, and may be generally used after being mapped to the application ID.

Figure 11:
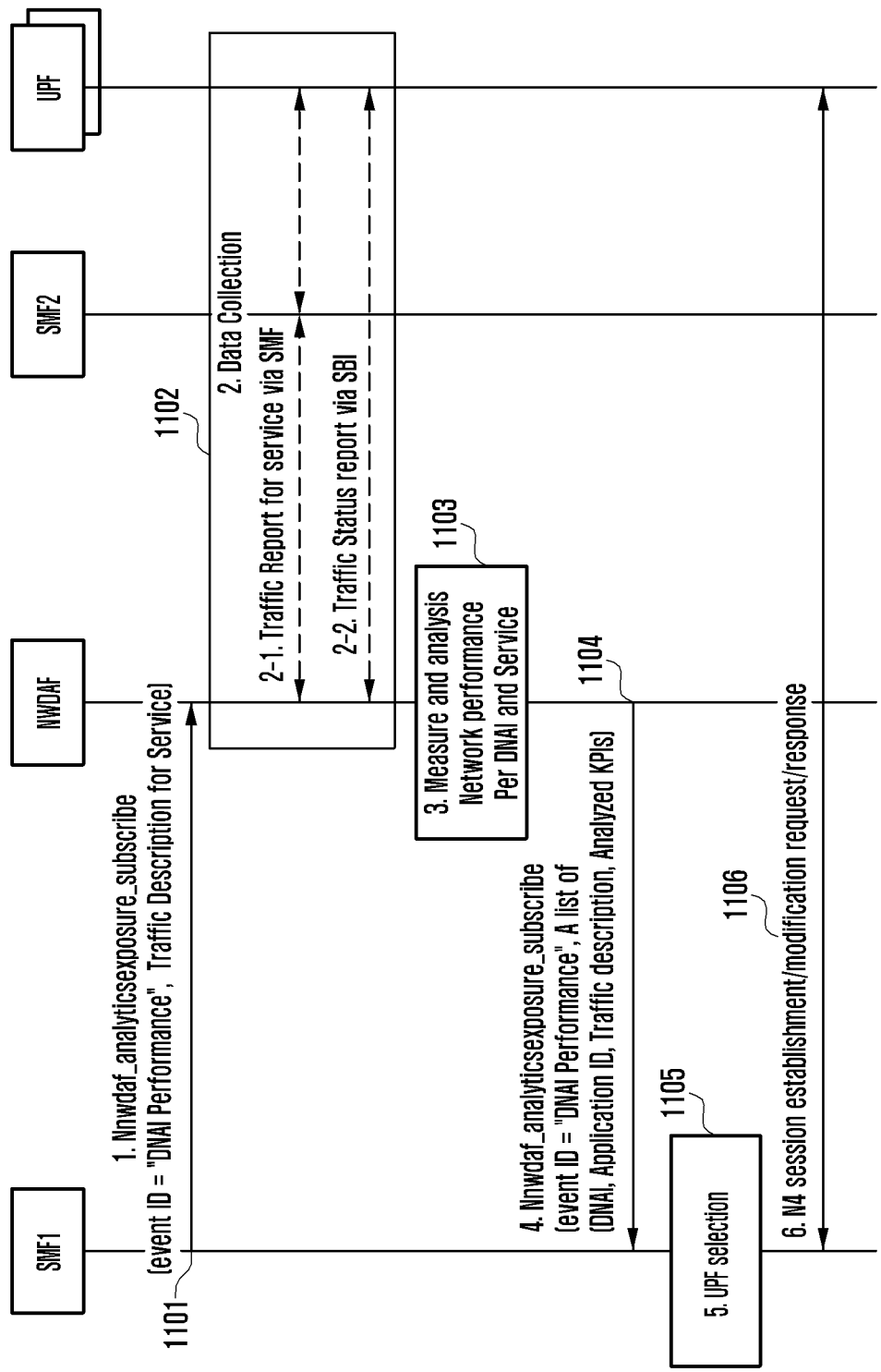
FIG. 11 illustrates a procedure in which an SMF selects a UPF providing an optimal DNAI for a PDU session according to an embodiment of the disclosure.

A procedure in which the SMF uses the disclosure is illustrated in FIG. 11.

FIG. 11 illustrates a procedure in which an SMF selects a UPF providing an optimal DNAI for a PDU session according to an embodiment of the disclosure.

Referring to FIG. 11, in operation 1101, the SMF may transmit traffic-related information for detecting traffic of an analytics service to make a request for analyzing performance for each DNN and each DNAI to an NWADF in operation 2202. The traffic-related information may include a combination of SDFT, SDFF, application, packet filter set, and/or PFD, and the DNN and the DNAI may also be included and requested as selective factors to limit the DNN or the DNAI of interest. Further, the NEF may perform authentication related to information indicating whether the AF can acquire analytics information before transmitting the request from the AF to the NWDAF.

In a second operation of FIG. 11, the NWDAF receiving the request from the SMF may collect traffic-related information from the SMF or the UPF in order to collect information related to service traffic for each DNN and each DNAI based on the requested information in operation 1102. Operation 2-1 may use a method of making a request for collecting information related to service traffic from the SMF, and operation 2-2 may collect information related to service traffic through an SBI provided by the UPF. Operations 2-1 and 2-2 may be selectively used, or a combination thereof may be used by a collection method through the SMF in the case of the UPF that cannot provide the direct SBI according to a situation. When specific DNN and DNAI are included in the first operation, the NWDAF may make a request for collecting traffic-related information only to the UPF or the SMF supporting the same. At this time, the NWDAF may use information stored in the UDM during a process of finding the UPF and the SMF related to a specific service or the NRF may be additionally used during the process of finding the UPF and the SMF. Not only the SMF transmitting the request but also all SMFs currently distributed to the core network may be the SMF participating in the process.

Meanwhile, according to an embodiment of the disclosure, the second operation of FIG. 11 may be omitted when the NWDAF has already collected analytics information from the UPF or the SMF.

In a third operation of FIG. 11, the NWDAF may analyze a characteristic for each DNAI or each DNN of service traffic collected from the UPF or the SMF and analyze performance of the DN according to each DNN or DNAI in operation 1103. Information which can be analyzed may include a delay in an interval between the server and the UPF, an error rate, a jitter, a bandwidth, a round trip time, a maximum transmission packet size (maximum transmission unit), and/or the number of intermediate path devices (hop count).

A fourth operation of FIG. 11 is an operation of transmitting information analyzed by the NWDAF to the AF through the NEF making a request for analysis. When paths having different service flows for each DNN or each DNAI are selected, the NWDAF may configure each of the traffic characteristics of the analyzed external DN in the form of a list and transmit the traffic characteristics to the SMF in operation 1104

In a fifth operation of FIG. 11, the AF may select an optimal DNAI for providing its own service based on information for each DNN or DNAI received from the NWDAF in operation 1105. In such a process, an optimal DNAI may be selected in consideration of all services through analysis of optimal performance of all services provided in a PDU session in which not only a specific service but also the current service is provided. Further, when a specific service moves to a specific DNAI without movement of a PDU session, the PDU session may be changed to use a plurality of PDU session anchors (PSAs) by installing an uplink classifier (UL CL) or a branching point (BP).

In a sixth operation of FIG. 11, the SMF may change the UPF or change the UPF configuration in order to change a PDU session in which a specific service is provided or a target PDU session so that the service or traffic of the SMF is provided through a specific DNAI in operation 1106.

Figure 12:
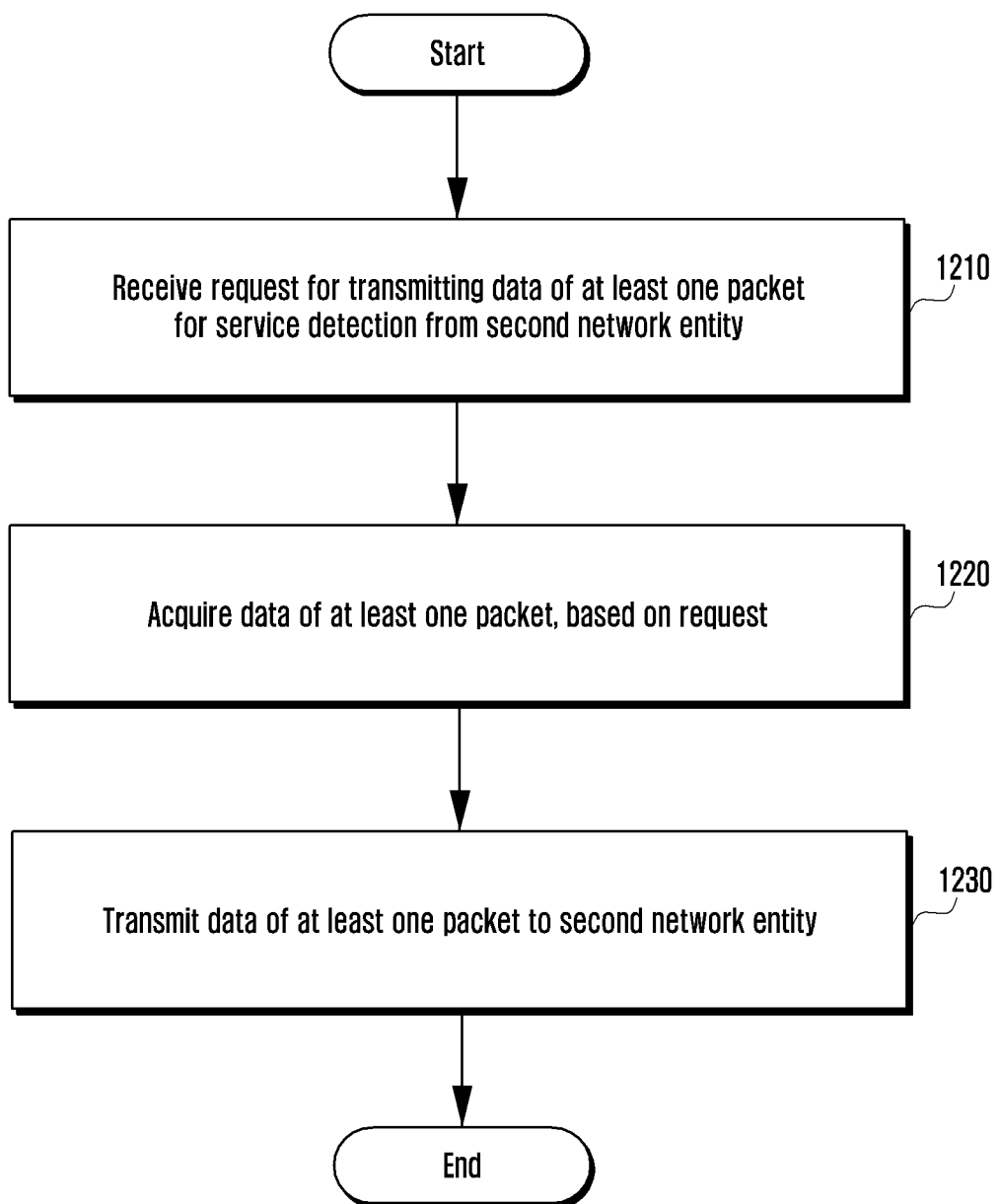
FIG. 12 illustrates a method of a first network entity for performing a UPF in a mobile communication system according to an embodiment of the disclosure.

FIG. 12 illustrates a method performed by a first network entity performing a UPF in a mobile communication system according to an embodiment of the disclosure.

Referring to FIG. 12, description that overlaps the description according to the embodiments of FIGS. 1 to 11, specifically, FIGS. 2 to 3, is omitted.

Referring to FIG. 12, the first network entity may receive a request for transmitting data of at least one packet for service detection from a second network entity performing a network data analytics function (NWDAF) in operation 1210.

In the embodiment of the disclosure, when new packet flow is detected by the first entity, the request may be a first request for transmitting data of at least one packet included in the new packet flow or a second request for transmitting data of all packets during a specific time period. The first request may be the event subscription request according to the embodiment of FIG. 2, and the second request may be the event subscription request according to the embodiment of FIG. 3.

In the embodiment of the disclosure, the first request may include identification information related to the first request, information indicating the number of packets to be transmitted, or information indicating whether data of the packet includes a payload of the packet.

In the embodiment of the disclosure, the first request may further include filter information for specific traffic, and the filter information may include at least one piece of identification information of the UE related to the specific traffic, information on a group of the UE, identification information of a PDU session, data network name (DNN) information, data network access identification (DNAI) information, single network slice selection assistance information (S-NS-SAI), or time information.

In the embodiment of the disclosure, the second request may include at least one piece of identification information related to the second request, information on the length of the specific time period, or information indicating whether data of the packet includes the payload of the packet.

In the embodiment of the disclosure, the second request may further include filter information for specific traffic, and the filter information may include at least one piece of identification information of the UE related to the specific traffic, information on a group of the UE, identification information of a PDU session, data network name (DNN) information, data network access identification (DNAI) information, single network slice selection assistance information (S-NSSAI), or time information.

The first network entity may acquire data of at least one packet in response to the request in operation 1220.

In the embodiment of the disclosure, when the request is the first request, the first network entity may include an operation of detecting the new packet flow based on the first request and acquiring data of at least one packet included in the new packet flow.

In the embodiment of the disclosure, when the request is the second request, the first network entity may include an operation of identifying the specific time period based on the second request and acquiring data of all packets during the specific time period.

The first network entity is the second network entity and may transmit data of at least one packet in operation 1230. The transmitted data of at least one packet may be analyzed by the second network entity.

Figure 13:
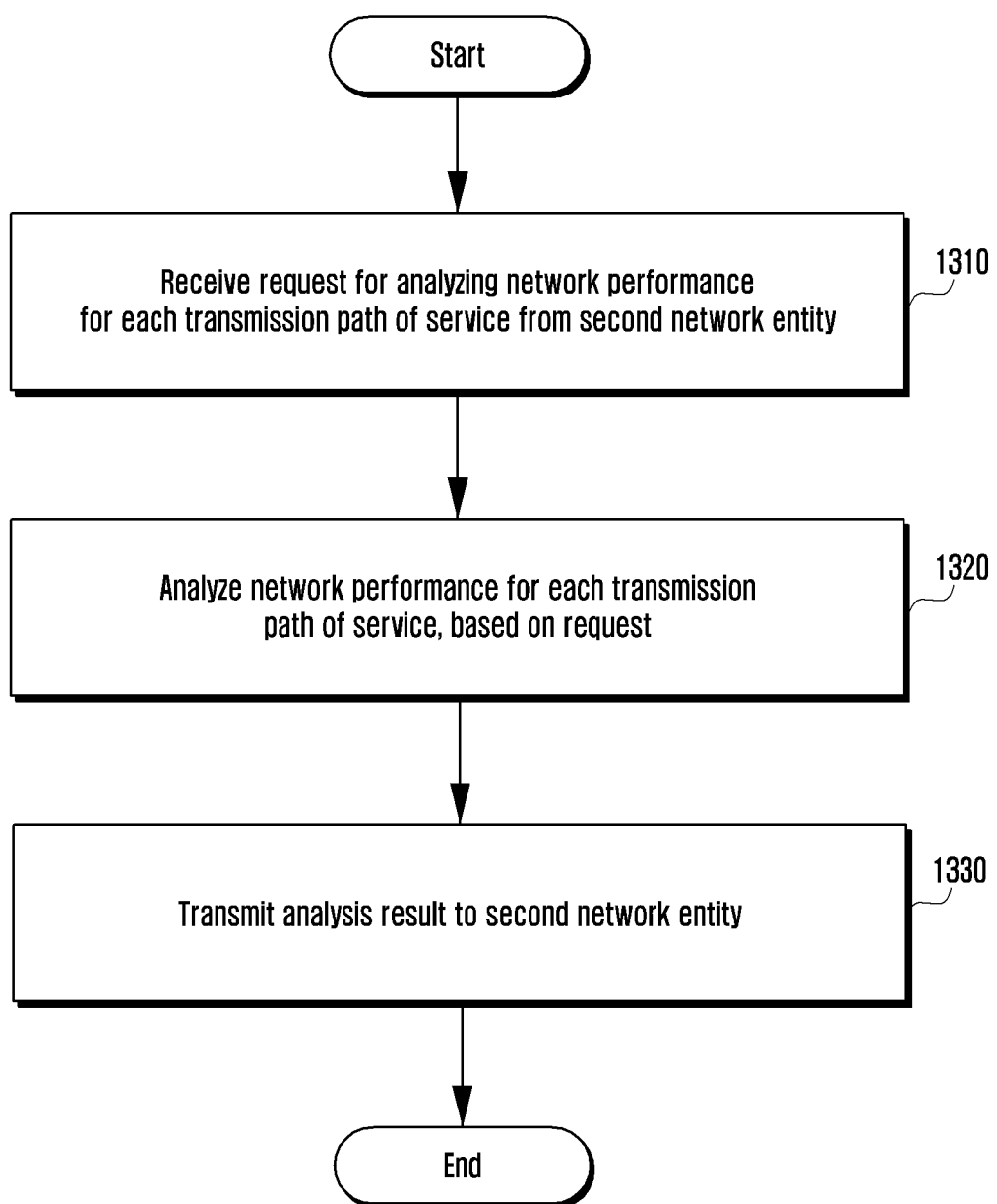
FIG. 13 illustrates a method of a first network entity for performing a NWDAF in a mobile communication system according to an embodiment of the disclosure.

FIG. 13 illustrates a method of a first network entity performing a network data analytics function (NWDAF) in a mobile communication system according to an embodiment of the disclosure.

Referring to FIG. 13, description that overlaps the description according to the embodiments of FIGS. 1 to 11, specifically, FIGS. 9 to 11 is omitted.

The first network entity may receive a request for analyzing network performance according to each transmission path of service from a second network entity in operation 1310.

At this time, the transmission path may be a transmission path between a third network entity performing a user plane function (UPF) and an external service providing the service. In the embodiment of the disclosure, the transmission path may be associated with data network access identifier (DNAI) information.

The first network entity may analyze the network performance according to each transmission path of the service in response to the request in operation 1320.

The first network entity may transmit the result of the analysis to the second network entity in operation 1330.

In the embodiment of the disclosure, the second network entity may be one of a network entity performing a session management function (SMF), a network entity performing a policy charging function (PCF), or a network entity performing an application function (AF). A procedure thereof is the same as the description made with reference to FIGS. 9 to 11.

In the embodiment of the disclosure, when the second network entity is the network entity performing the session management function (SMF), the result of the analysis may be used to select the third network entity by the second network entity. This is the same as the description made with reference to the embodiment of FIG. 11.

In the embodiment of the disclosure, when the second network entity is the network entity performing the policy charging function (PCF) or the network entity performing the application function (AF), the result of the analysis may be used to determine data network access identifier (DNAI) information for a PDU session associated with the service by the second network entity. Each thereof is the same as the description made with reference to the embodiments of FIGS. 9 and 10.

Figure 14:
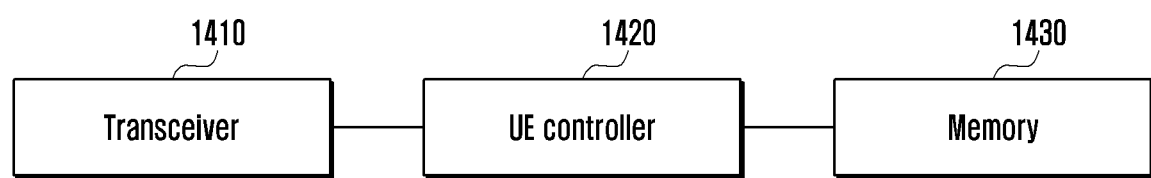
FIG. 14 illustrates a structure of a user equipment (UE) according to an embodiment of the disclosure.

FIG. 14 illustrates a structure of a UE according to an embodiment of the disclosure.

Referring to FIG. 14, the UE may include a transceiver 1410, a UE controller 1420, and a memory 1430. In the disclosure, the UE controller 1420 may be defined as a circuit, an application-specific integrated circuit, or at least one processor.

The transceiver 1410 may transmit/receive a signal to/from another network entity. The transceiver may receive system information from, for example, the base station, and receive control a synchronization signal, a reference signal, or information and data on the UE.

The UE controller 1420 may control the overall operation of the UE according to an embodiment proposed by the disclosure. For example, the UE controller may control signal flow between blocks to perform the operation according to the drawings and the flowcharts described above. Specifically, the UE controller may operate according to a control signal from the base station, and may exchange a message or a signal with the UE and/or a network entity.

The memory 1430 may store at least one piece of information transmitted and received through the transceiver 1410 and information generated through the UE controller.

Figure 15:
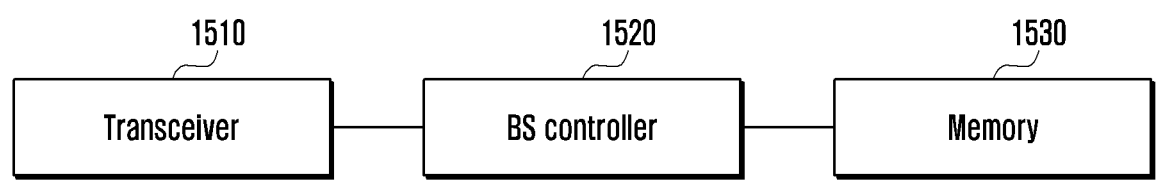
FIG. 15 illustrates a structure of a base station according to an embodiment of the disclosure.

FIG. 15 illustrates a structure of a base station according to an embodiment of the disclosure.

Referring to FIG. 15, the base station may include a transceiver 1510, a base station controller 1520, and a memory 1530. In the disclosure, the base station controller 1520 may be defined as a circuit, an application-specific integrated circuit, or at least one processor.

The transceiver 1510 may transmit/receive a signal to/from another network entity. The transceiver may transmit system information, a synchronization signal, reference signal, or control information and data on the UE to, for example, the UE, and may transmit and receive control information and data for providing a service to the UE from the NF.

The base station controller 1520 may control the overall operation of the base station according to an embodiment proposed by the disclosure. For example, the base station controller may control signal flow between blocks to perform the operation according to the drawings and the flowcharts described above. Specifically, the base station controller may exchange messages or signals with the UE, the base station, and/or a network entity.

The memory 1530 may store at least one piece of information transmitted and received through the transceiver and information generated through the base station controller.

Figure 16:
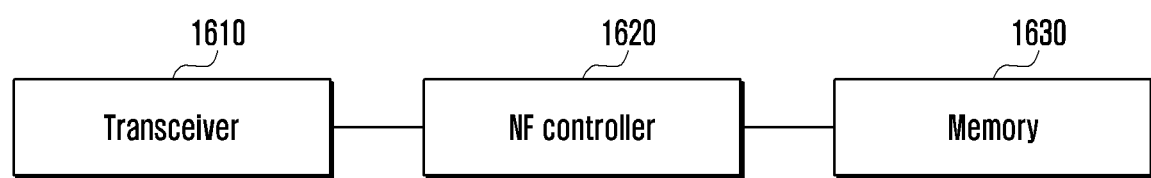
FIG. 16 illustrates a structure of a network entity (including an NF instance) according to an embodiment of the disclosure.

FIG. 16 illustrates a structure of a network entity (including an NF instance) according to an embodiment of the disclosure.

Referring to FIG. 16, the network entity may be, for example, one of network entities performing the network function (NF) of FIG. 1. For example, the network entity may be a network entity performing a network data analytics function (NWDAF), a network entity performing a session management function (SMF), or a network entity performing a user plane function (UPF), but is not limited to a specific NF. The NF may be provided in the form of an instance. When the NF is provided as an instance, the NF exists in the form of software code. Since the NF may mean an executable state through allocation of physical or/and logical resources from a computing system for performing a function of the NF in a physical computing system, for example, a specific computing system existing in a core network, the structure of FIG. 16 may physical division or logical division.

Referring to FIG. 16, the network entity (NF) may include a transceiver 1610, an NF controller 1620, and a memory 1630.

The transceiver 1610 may transmit/receive a signal to/from another network entity. The transceiver may transmit and receive system information to, for example, another network entity (NF) or the base station (RAN), and may transmit and receive control information and data on the UE.

The NF controller 1620 may control the overall operation of the NF according to an embodiment proposed by the disclosure. For example, the NF controller 1620 may control signal flow between blocks to perform the operation according to the procedures described with reference to FIGS. 2 to 11. For example, the NF controller 1620 may control the operation proposed by the disclosure in order to provide service detection in a mobile communication system according to an embodiment.

The memory 1630 may store at least one piece of information transmitted and received through the transceiver and information generated through the NF controller. For example, the memory 1630 may store information required for service detection according to the aforementioned embodiments.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described embodiments of the disclosure, an element included in the disclosure is expressed in the singular or the plural according to presented embodiments of the disclosure. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. Further, it will be apparent that at least one of the above-described embodiments may be performed in combination. Therefore, the scope of various embodiments of the disclosure should be construed to include, in addition to the embodiments disclosed herein, all changes and modifications derived based on the technical idea of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a first network entity performing a network data analysis function (NWDAF) in a mobile communication system, the method comprising:
receiving a request from a second network entity to analyze network performance by transmission path for a service;
performing the analysis of network performance for each transmission path for the service based on the request; and
transmitting a result of the analysis to the second network entity,
wherein the transmission path is a transmission path between a third network entity performing a user plane function (UPF) and an external server providing the service, and
wherein the transmission path is related to data network access identifier (DNAI) information.

2. The method of claim 1, wherein the second network entity is one of a session management function (SMF) entity, a policy control function (PCF) entity, or an application function (AF) entity.

3. The method of claim 2, wherein the result of the analysis is used to select the third network entity by the second network entity, in case that the second network entity is the SMF entity.

4. The method of claim 2, wherein the result of the analysis is used to determine DNAI information for PDU session related to the service by the second network entity, in case that the second network entity is the PCF entity.

5. The method of claim 2, wherein the result of the analysis is used to determine DNAI information for PDU session related to the service by the second network entity, in case that the second network entity is the AF entity.

6. A first network entity performing a network data analysis function (NWDAF) in a mobile communication system, the first network entity comprising:
a transceiver; and
a controller coupled with the transceiver;
wherein the controller is configured to:
receive a request from a second network entity to analyze network performance by transmission path for a service,
perform the analysis of network performance for each transmission path for the service based on the request, and
transmit a result of the analysis to the second network entity,
wherein the transmission path is a transmission path between a third network entity performing a user plane function (UPF) and an external server providing the service, and
wherein the transmission path is related to data network access identifier (DNAI) information.

7. The first network entity of claim 6, wherein the second network entity is one of a session management function (SMF) entity, a policy control function (PCF) entity, or an application function (AF) entity.

8. The first network entity of claim 7, wherein the result of the analysis is used to select the third network entity by the second network entity, in case that the second network entity is the SMF entity.

9. The first network entity of claim 7, wherein the result of the analysis is used to determine DNAI information for PDU session related to the service by the second network entity, in case that the second network entity is the PCF entity.

10. The first network entity of claim 7, wherein the result of the analysis is used to determine DNAI information for PDU session related to the service by the second network entity, in case that the second network entity is the AF entity.

* * * * *